(12) United States Patent
Katsuki et al.

(10) Patent No.: US 10,926,760 B2
(45) Date of Patent: Feb. 23, 2021

(54) INFORMATION PROCESSING DEVICE, INFORMATION PROCESSING METHOD, AND COMPUTER PROGRAM PRODUCT

(71) Applicant: Kabushiki Kaisha Toshiba, Tokyo (JP)

(72) Inventors: Rie Katsuki, Kanagawa (JP); Tsuyoshi Tasaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 99 days.

(21) Appl. No.: 16/123,169

(22) Filed: Sep. 6, 2018

(65) Prior Publication Data

US 2019/0291724 A1 Sep. 26, 2019

(30) Foreign Application Priority Data

Mar. 20, 2018 (JP) .............................. JP2018-053090

(51) Int. Cl.
*B60W 30/09* (2012.01)
*B60W 30/095* (2012.01)
*B60W 10/20* (2006.01)
*B60W 10/184* (2012.01)
*B60W 50/14* (2020.01)
(Continued)

(52) U.S. Cl.
CPC .......... *B60W 30/09* (2013.01); *B60W 10/184* (2013.01); *B60W 10/20* (2013.01); *B60W 30/095* (2013.01); *B60W 30/143* (2013.01); *B60W 50/14* (2013.01);
(Continued)

(58) Field of Classification Search
CPC .... B60W 30/09; B60W 30/095; B60W 10/20; B60W 10/184; B60W 50/14; B60W 30/143; B60W 2050/146; G06K 9/00348; G06K 9/00805
See application file for complete search history.

(56) References Cited

U.S. PATENT DOCUMENTS

| 3,580,978 A | * | 5/1971 | Ebeling | ..................... G09B 9/32 |
| | | | | 434/43 |
| 5,653,900 A | * | 8/1997 | Clement | ............ B23K 26/0838 |
| | | | | 219/121.68 |

(Continued)

FOREIGN PATENT DOCUMENTS

| CN | 102353945 A | * | 2/2012 | ........... G06K 9/6215 |
| CN | 103852763 A | * | 6/2014 | ............... G01S 7/41 |

(Continued)

*Primary Examiner* — Behrang Badii
*Assistant Examiner* — Jalal C Coduroglu
(74) *Attorney, Agent, or Firm* — Finnegan, Henderson, Farabow, Garrett & Dunner, L.L.P.

(57) ABSTRACT

According to an embodiment, an information processing device includes a memory and one or more hardware processors electrically coupled to the memory and configured to function as a change unit, and a display controller. The change unit is configured to change a reference path to a position at a lateral distance when the lateral distance obtained from lateral environmental information indicating a lateral environment of the reference path referred to as a scheduled running path of a moving body is larger than a distance from a lateral end to a center of a running region of the moving body. The display controller is configured to display display information including the reference path on a display unit.

24 Claims, 26 Drawing Sheets

(51) Int. Cl.
  *G06K 9/00* (2006.01)
  *B60W 30/14* (2006.01)
(52) U.S. Cl.
  CPC ..... *G06K 9/00348* (2013.01); *G06K 9/00805* (2013.01); *B60W 2050/146* (2013.01)

(56) References Cited

U.S. PATENT DOCUMENTS

| | | | | |
|---|---|---|---|---|
| 7,650,239 B2 * | 1/2010 | Samukawa | ............. | G01S 17/42 701/300 |
| 7,672,481 B2 * | 3/2010 | Kanai | ................ | G06K 9/00805 382/103 |
| 7,684,964 B2 * | 3/2010 | Outhred | ................ | G06F 9/4492 703/2 |
| 7,840,355 B2 * | 11/2010 | Breed | .................. | B60W 30/04 701/301 |
| 8,862,383 B2 * | 10/2014 | Tsuchida | ............... | G01S 13/931 701/301 |
| 9,069,834 B2 * | 6/2015 | Maeda | ................ | G06F 11/2094 |
| 9,115,975 B2 * | 8/2015 | Liesener | ............ | G01B 9/02044 |
| 9,177,040 B2 * | 11/2015 | Yamada | ............... | B60W 30/143 |
| 9,210,608 B2 * | 12/2015 | Nakaya | ............... | H04W 28/0236 |
| 9,367,200 B2 * | 6/2016 | Kumagai | ................ | G06F 3/14 |
| 9,457,793 B2 * | 10/2016 | Uno | ................. | B60W 50/0098 |
| 9,545,880 B2 * | 1/2017 | Kajiwara | ........... | G01C 21/3697 |
| 9,643,589 B2 * | 5/2017 | Hokoi | ................. | B60W 50/0097 |
| 9,734,416 B2 * | 8/2017 | Kanetake | ................ | G06T 7/269 |
| 9,753,922 B2 * | 9/2017 | Hausler | ................... | H04L 67/42 |
| 9,761,011 B2 * | 9/2017 | Utsunomiya | .......... | G06T 7/251 |
| 9,834,196 B2 * | 12/2017 | Morisaki | ................ | B60W 50/14 |
| 9,855,935 B2 * | 1/2018 | Lee | ...................... | G01S 13/867 |
| 10,026,321 B2 * | 7/2018 | Prasad | .................... | B60T 7/22 |
| 10,089,875 B2 * | 10/2018 | Smith | .................. | G08G 1/0129 |
| 2002/0072850 A1 * | 6/2002 | McClure | ................ | A01B 69/008 701/25 |
| 2008/0140270 A1 * | 6/2008 | Davis | .................. | G08G 5/0021 701/8 |
| 2009/0268162 A1 * | 10/2009 | Stetson | .................. | A61B 3/102 351/246 |
| 2010/0201509 A1 | 8/2010 | Hara et al. | | |
| 2010/0324797 A1 * | 12/2010 | Fritz | ................... | B60W 10/184 701/96 |
| 2012/0010480 A1 * | 1/2012 | Ikai | .................... | A61B 1/00045 600/302 |
| 2012/0057845 A1 * | 3/2012 | Obana | .................. | H04N 9/8227 386/241 |
| 2012/0310481 A1 * | 12/2012 | Kanning | ............ | B62D 15/0285 701/41 |
| 2012/0313943 A1 * | 12/2012 | Tsukagoshi | ............... | A61B 8/13 345/424 |
| 2013/0085975 A1 * | 4/2013 | Wellhoefer | ......... | B60R 21/0134 706/46 |
| 2013/0190085 A1 * | 7/2013 | Yoshikawa | .......... | A63F 13/573 463/31 |
| 2013/0286205 A1 * | 10/2013 | Okada | ................ | G06K 9/00805 348/148 |
| 2013/0294334 A1 * | 11/2013 | Kabashima | ......... | H04W 52/221 370/328 |
| 2014/0200426 A1 * | 7/2014 | Taub | .................. | A61B 5/14532 600/347 |
| 2014/0208264 A1 * | 7/2014 | Kumagai | ............... | G06F 3/0481 715/802 |
| 2014/0327611 A1 * | 11/2014 | Ono | ................... | G06K 9/6202 345/156 |
| 2014/0354456 A1 * | 12/2014 | Gannon | ................ | G08G 5/025 340/972 |
| 2014/0376491 A1 * | 12/2014 | Li | ....................... | G02B 27/017 370/329 |
| 2015/0128223 A1 * | 5/2015 | Magri | ................ | H04L 63/1433 726/4 |
| 2015/0309172 A1 * | 10/2015 | Mori | .................... | G01S 13/345 342/70 |
| 2016/0119056 A1 * | 4/2016 | Costantini | ........... | H04L 63/1425 726/4 |
| 2016/0147308 A1 * | 5/2016 | Gelman | .................. | G06F 3/017 345/156 |
| 2016/0209511 A1 * | 7/2016 | Dolinar | ................. | E01C 23/163 |
| 2016/0292546 A1 * | 10/2016 | Yamashita | ............ | B41J 3/4078 |
| 2016/0357391 A1 * | 12/2016 | Nilo | ..................... | G06F 3/04883 |
| 2017/0052032 A1 * | 2/2017 | Miksa | ................. | G01C 21/30 |
| 2017/0076470 A1 * | 3/2017 | Yoo | ............................ | G06T 1/20 |
| 2017/0101092 A1 * | 4/2017 | Nguyen Van | ......... | G01S 13/723 |
| 2017/0116487 A1 * | 4/2017 | Yamazaki | ............ | H04N 13/271 |
| 2017/0131682 A1 * | 5/2017 | Nolte | .................... | G03H 1/0443 |
| 2017/0147890 A1 * | 5/2017 | Sano | ................... | G06K 9/00805 |
| 2017/0177760 A1 * | 6/2017 | Socha | ...................... | G06F 17/18 |
| 2017/0180701 A1 * | 6/2017 | Matono | ..................... | G06T 7/70 |
| 2017/0217447 A1 * | 8/2017 | Iguchi | .................... | B60W 50/14 |
| 2017/0234675 A1 * | 8/2017 | Iddan | ................ | G01B 9/02069 356/479 |
| 2017/0270682 A1 * | 9/2017 | Tasaki | .................. | G06K 9/6211 |
| 2017/0341661 A1 * | 11/2017 | Nishiyama | .......... | G05D 1/0061 |
| 2017/0345180 A1 * | 11/2017 | Sugiura | ................. | G01S 7/4808 |
| 2017/0357849 A1 * | 12/2017 | Katsu | .................... | G06Q 30/02 |
| 2018/0009395 A1 * | 1/2018 | Hoffmann | ............... | B60R 11/04 |
| 2018/0012373 A1 * | 1/2018 | Ozaki | ........................ | G06T 7/70 |
| 2018/0012407 A1 * | 1/2018 | Chuang | ..................... | G06T 7/75 |
| 2018/0018510 A1 * | 1/2018 | Williams | .................. | G06T 7/38 |
| 2018/0024238 A1 * | 1/2018 | Khlifi | ................... | G01S 13/867 342/52 |
| 2018/0046195 A1 * | 2/2018 | Nakamura | ............ | B60W 50/12 |
| 2018/0051996 A1 | 2/2018 | Katsuki et al. | | |
| 2018/0051998 A1 * | 2/2018 | Stephens | ............ | G01C 21/3407 |
| 2018/0052458 A1 * | 2/2018 | Tsuji | .................... | B60W 50/14 |
| 2018/0056992 A1 * | 3/2018 | Sogen | .................. | G08G 1/0112 |
| 2018/0208183 A1 * | 7/2018 | Glander | .................. | B60W 50/14 |
| 2018/0364060 A1 | 12/2018 | Katsuki et al. | | |
| 2019/0291724 A1 * | 9/2019 | Katsuki | .................. | B60W 50/14 |
| 2019/0389461 A1 * | 12/2019 | Ohmura | .................. | B60W 30/10 |
| 2020/0082621 A1 * | 3/2020 | Son | ..................... | G06K 9/00798 |

FOREIGN PATENT DOCUMENTS

| | | | | |
|---|---|---|---|---|
| CN | 103869300 A | * | 6/2014 | ......... G01S 13/726 |
| CN | 104111654 A | * | 10/2014 | ......... G05D 1/0274 |
| CN | 103703496 B | * | 1/2016 | ............. B60T 7/22 |
| CN | 103635946 B | * | 4/2016 | ....... B60W 30/0953 |
| CN | 104169136 B | * | 6/2016 | ............. B60T 7/22 |
| CN | 103748622 B | * | 10/2016 | ............. B60T 7/22 |
| CN | 107054368 A | * | 8/2017 | ........... B60W 50/14 |
| CN | 107181908 A | * | 9/2017 | ............... G08G 1/04 |
| CN | 107490793 A | * | 12/2017 | ............. G01S 13/89 |
| CN | 107628405 A | * | 1/2018 | ............. G08G 1/167 |
| CN | 108394410 A | * | 8/2018 | ........... G05D 1/0212 |
| JP | 2009-230627 A | | 10/2009 | |
| JP | 2010-181928 A | | 8/2010 | |
| JP | 5953810 B | | 7/2016 | |
| JP | 2018-28479 A | | 2/2018 | |
| JP | 2019-6143 A | | 1/2019 | |
| WO | WO-2006005696 A1 | * | 1/2006 | .......... G01S 7/4972 |
| WO | WO-2011064824 A1 | * | 6/2011 | ....... B60W 30/0953 |
| WO | WO 2016/027347 A1 | | 2/2016 | |
| WO | WO-2016117200 A1 | * | 7/2016 | .......... G06K 9/6202 |
| WO | WO-2017041303 A1 | * | 3/2017 | .......... G06K 9/0063 |
| WO | WO-2018000386 A1 | * | 1/2018 | ............. G05D 1/00 |
| WO | WO-2018030159 A1 | * | 2/2018 | ........... B60W 50/14 |
| WO | WO-2018070655 A1 | * | 4/2018 | .......... G06K 9/6215 |

* cited by examiner

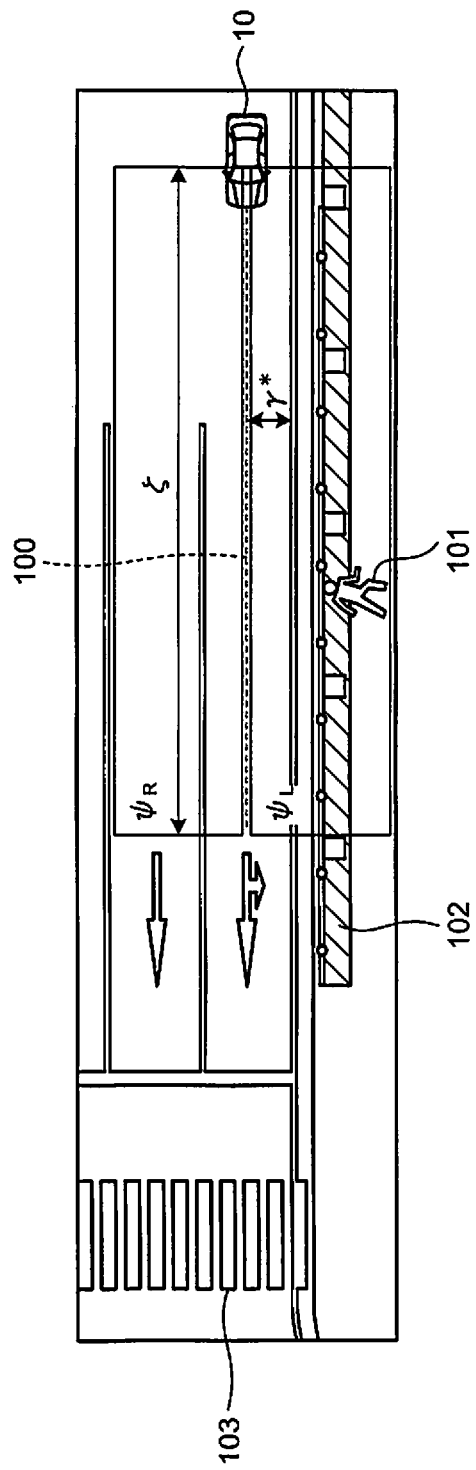

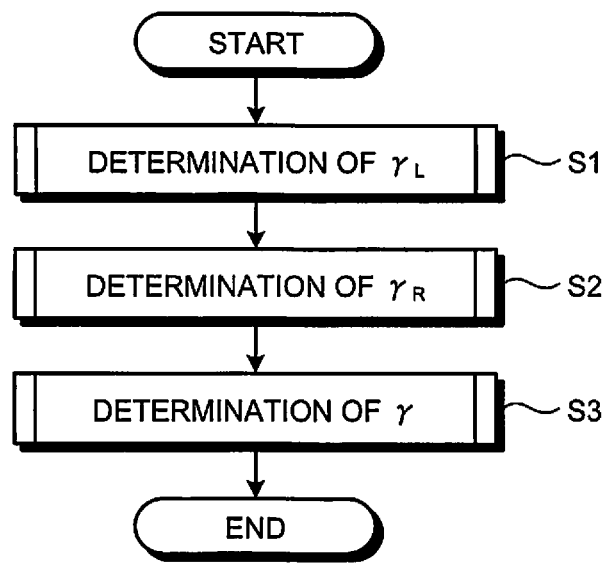
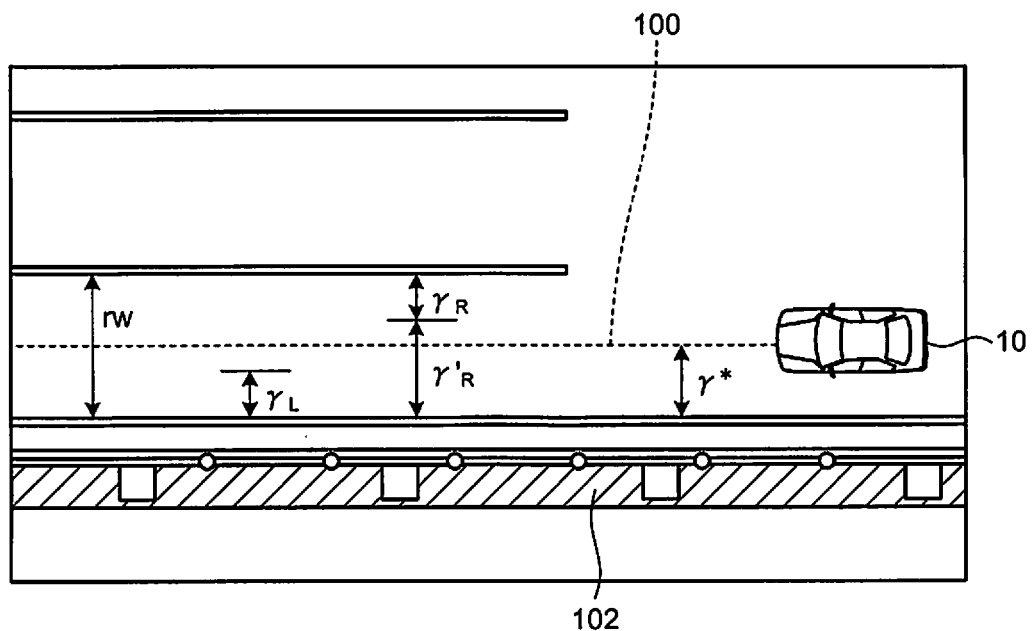

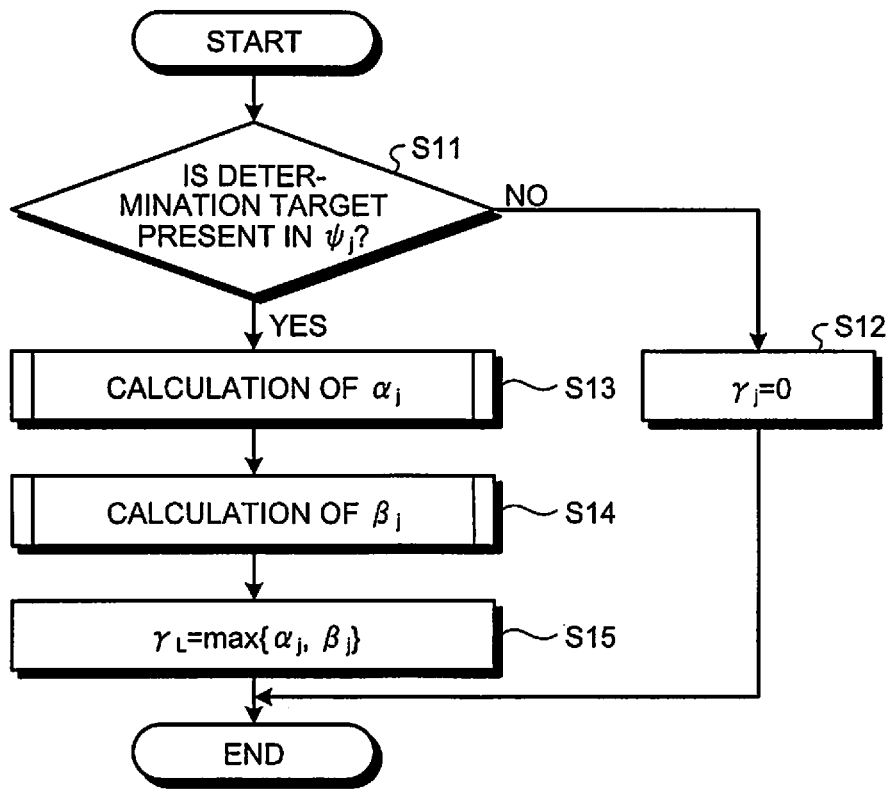

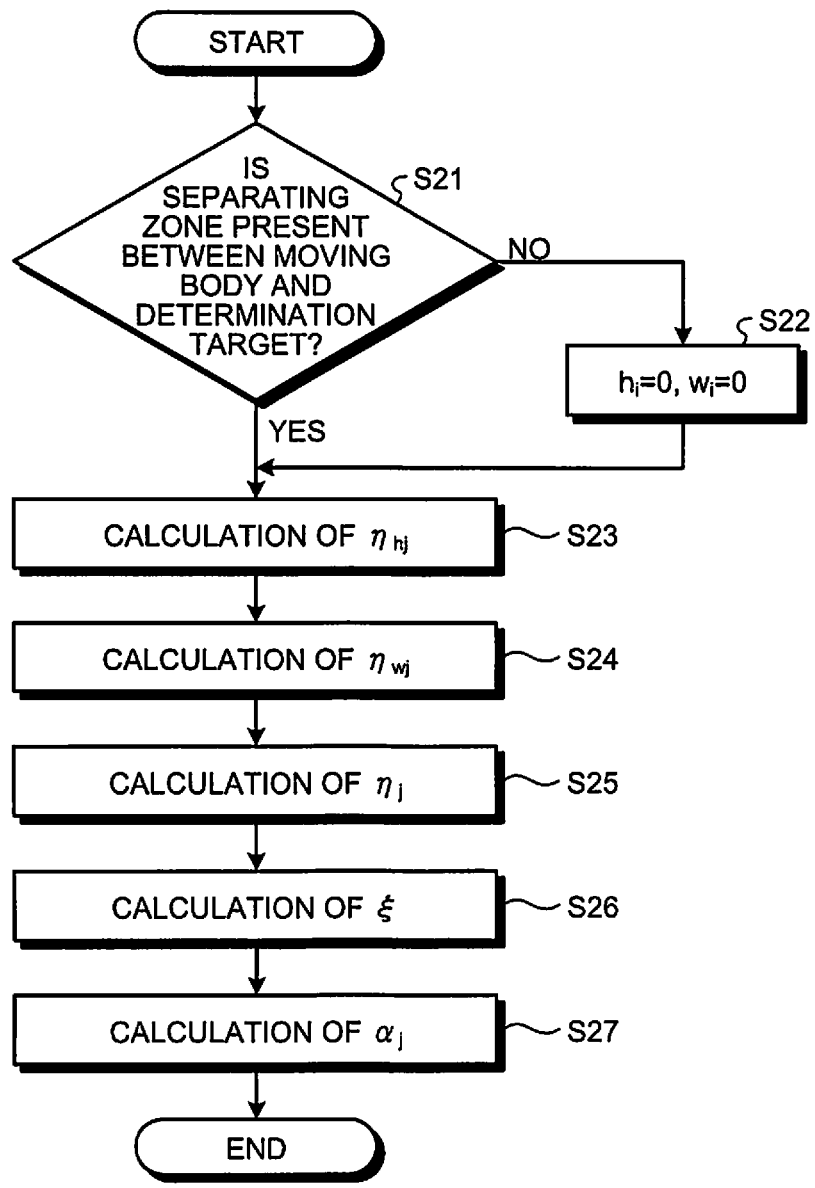

FIG.19

| OBJECT/SIGN | $\eta_o$ |
|---|---|
| PEDESTRIAN BRIDGE | 0.1 |
| PEDESTRIAN CROSSWALK | 0.2 |
| CAR PARKED ON SIDEWALK | 0.4 |
| ... | ... |

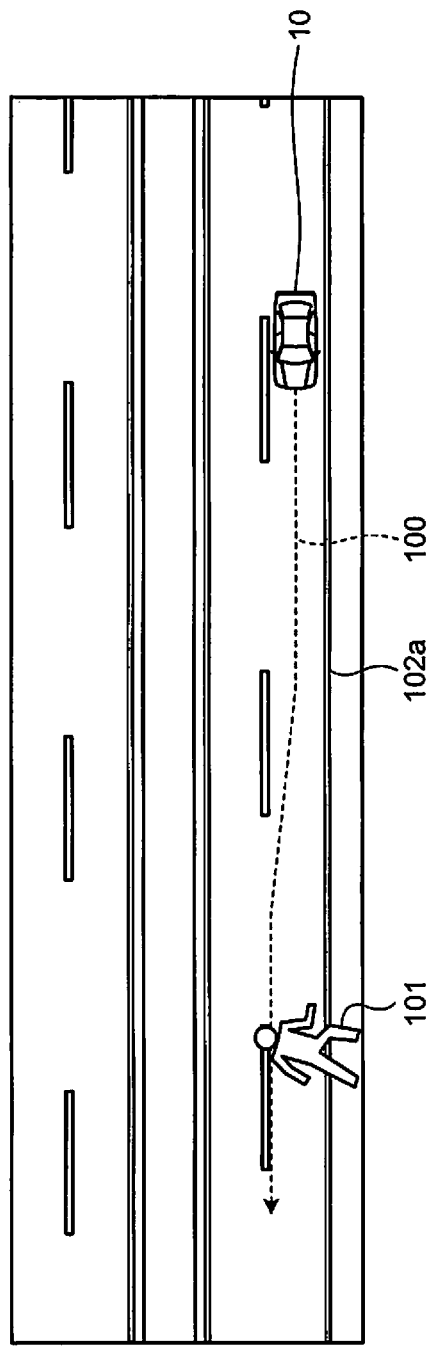

FIG.30

| HEIGHT h OF SEPARATION ZONE [m] | $\gamma_L$ |
|---|---|
| h ≤ 1.0 | $\gamma^*$ |
| 1.0 < h ≤ 3.0 | $\gamma^* + 0.2$ |
| 3.0 < h | $\gamma^* + 0.4$ |

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-053090, filed on Mar. 20, 2018; the entire contents of which are incorporated herein by reference.

FIELD

Embodiments described herein relate generally to an information processing device, an information processing method, and a computer program product.

BACKGROUND

Automatic driving techniques automatically steering vehicles attract attention. Techniques have been known that safely avoid moving objects such as pedestrians in automatic driving.

It is, however, difficult for the conventional techniques to determine safer running paths. For example, it is difficult to determine a safer running path when a determination target (e.g., a pedestrian) for determining whether the target enters a running region of a moving body does not perform a behavior associated with entering the running region.

BRIEF DESCRIPTION OF THE DRAWINGS

FIG. 4 is a diagram illustrating an example of a determination target in the first embodiment;

FIG. 5 is a flowchart illustrating an example of the whole flow of an information processing method in the first embodiment;

FIG. 6 is a diagram for explaining exemplary variables used in the information processing in the first embodiment;

FIG. 7 is a flowchart illustrating an exemplary detailed flow at steps S1 and S2;

FIG. 8 is a flowchart illustrating an exemplary detailed flow at step S13;

FIG. 19 is a table illustrating an exemplary list of constants $\eta_o$ in the first embodiment;

FIG. 29 is a diagram illustrating an example of the display information displayed as a top view display in the first embodiment;

FIG. 30 is a table listing examples of the left side distance $\gamma_L$ in a second embodiment.

DETAILED DESCRIPTION

According to an embodiment, an information processing device includes a memory and one or more hardware processors electrically coupled to the memory and configured to function as a change unit, and a display controller. The change unit is configured to change a reference path to a position at a lateral distance when the lateral distance obtained from lateral environmental information indicating a lateral environment of the reference path referred to as a scheduled running path of a moving body is larger than a distance from a lateral end to a center of a running region of the moving body. The display controller is configured to display display information including the reference path on a display unit.

The following describes embodiments of an information processing device, an information processing method, and a computer program product in detail with reference to the accompanying drawings.

First Embodiment

An information processing device in a first embodiment calculates a reference path (RP). The following describes an example of the reference path.

Figure 1:
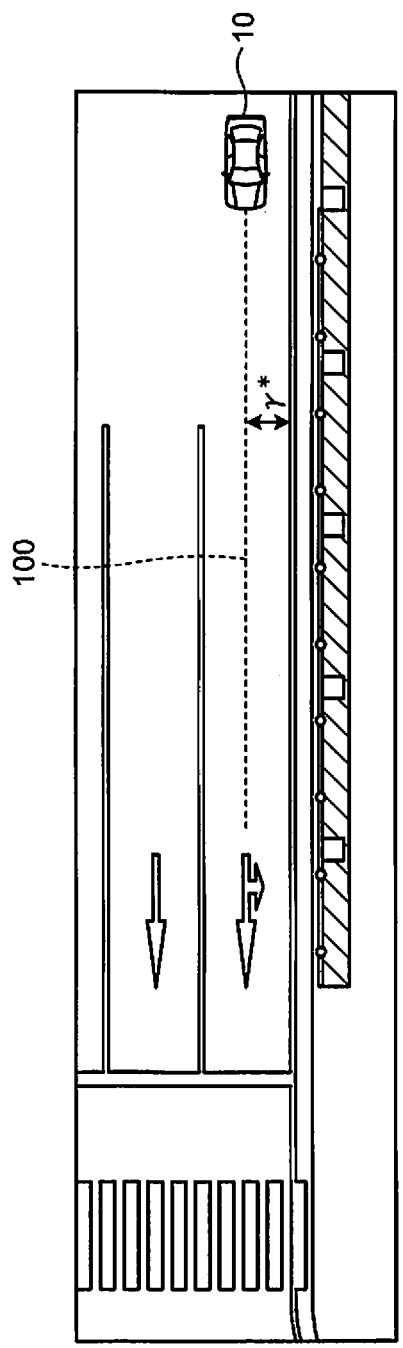
FIG. 1 is a diagram illustrating an example of a reference path in a first embodiment.

FIG. 1 is a diagram illustrating an example of a reference path 100 in the first embodiment. The example illustrated in FIG. 1 illustrates the reference path 100 of a moving body 10.

Any type of moving body is applicable for the moving body 10. The moving body 10 in the first embodiment is a vehicle such as a car, for example. The moving body 10 in the first embodiment has an automatic driving function that automatically steers the moving body 10.

The reference path 100 is referred to as a scheduled running path of the moving body 10. The reference path 100 includes path information indicating at least a path along which the moving body 10 is scheduled to run. In the first embodiment, the reference path 100 includes the path information and speed information. The reference path 100 in the first embodiment includes, as the path information, a path that is along the center of a running region (carriage way) and along which the moving body 10 runs, and a legal speed as the speed information, for example.

An initial value of the reference path 100 in the first embodiment is a path along which the moving body 10 runs the center of the running region at a legal speed. Any method may be employed for determining the initial value (default) of the reference path 100. The initial value of the reference path 100 may be determined from information included in a high resolution map, which is described later with reference to FIG. 13, for example.

The initial value of the reference path 100 may be determined from information such as white lines (lane lines) on the road recognized by a car-mounted camera of the moving body 10, for example. The initial value of the reference path 100 may be determined from the center line that indicates the center of the running region interposed between the two white lines on both sides of the running region, for example.

In FIG. 1, $\gamma^*$ is information that indicates the initial value of the reference path 100. In the example illustrated in FIG. 1, $\gamma^*$, which indicates the initial value of the reference path 100, is the distance from the left end of the running region to the reference path 100. In the first embodiment, $\gamma^*$ is the distance from the left end to the center of the running region.

Exemplary Structure of Moving Body

Figure 2:
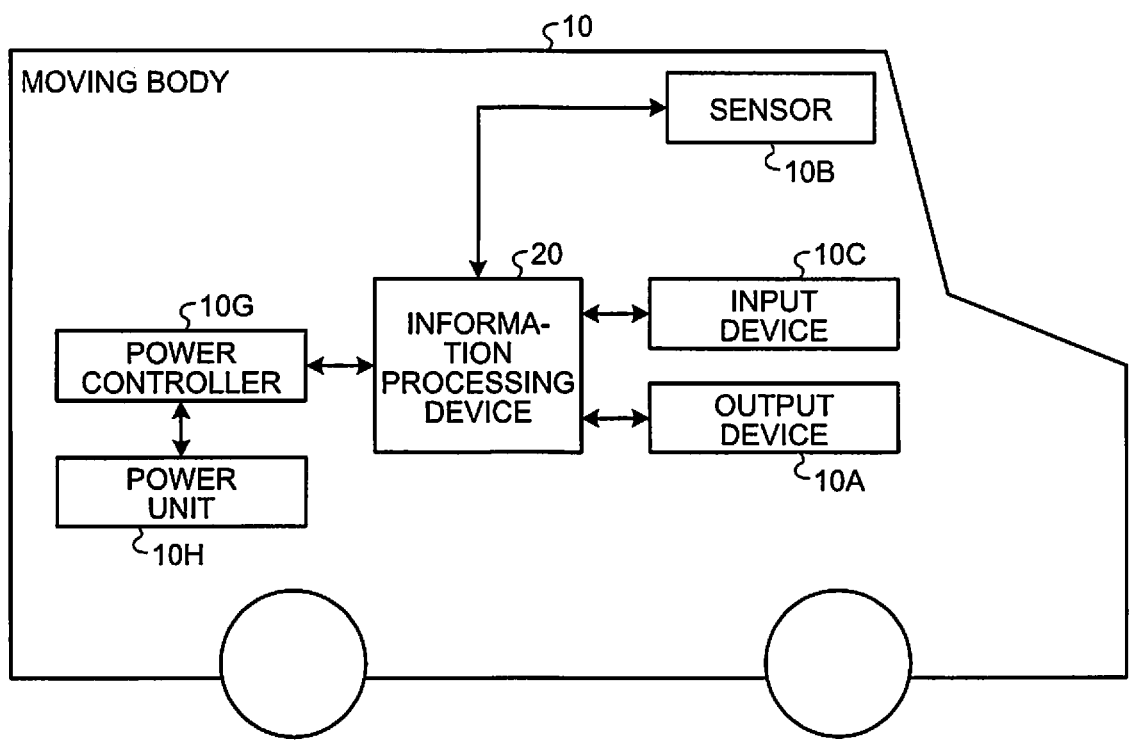
FIG. 2 is a schematic diagram illustrating an exemplary structure of a moving body in the first embodiment.

FIG. 2 is a schematic diagram illustrating an exemplary structure of the moving body 10 in the first embodiment. The moving body 10 in the first embodiment includes an output device 10A, a sensor 10B, an input device 10C, a power controller 10G, a power unit 10H, and an information processing device 20.

The output device 10A outputs information. The output device 10A includes a communication unit 12, a display unit 13, and a speaker 14, which are described later with reference to FIG. 3, for example.

The sensor 10B acquires environmental information indicating a running environment of the moving body 10. The environmental information includes observational information acquired by internal sensors of the moving body 10 and peripheral information acquired by external sensors of the moving body 10, for example. The observational information is a speed of the moving body 10 acquired by a speed sensor, for example. The peripheral information is an image acquired by the car-mounted camera, for example.

The input device 10C receives information input by a user. For example, the input device 10C receives information indicating an instruction from a passenger on the moving body 10. For another example, the input device 10C receives setting information or the like indicating settings for the information processing device 20 from the passenger on the moving body 10 and a developer of the information processing device 20. The setting information includes a relational expression representing a relation between the height of a separating zone and a risk of pedestrians stepping into the road, for example.

The power controller 10G produces control signals for controlling an accelerator and a steering angle, for example, and controls the power unit 10H by the control signals.

The power unit 10H is a device that drives the moving body 10. The power unit 10H is an engine, a motor, or wheels, for example.

The information processing device 20 processes information. The information processing device 20 processes information input from other functional blocks, for example. An exemplary structure of the information processing device 20 is described with reference to FIG. 3.

Figure 3:
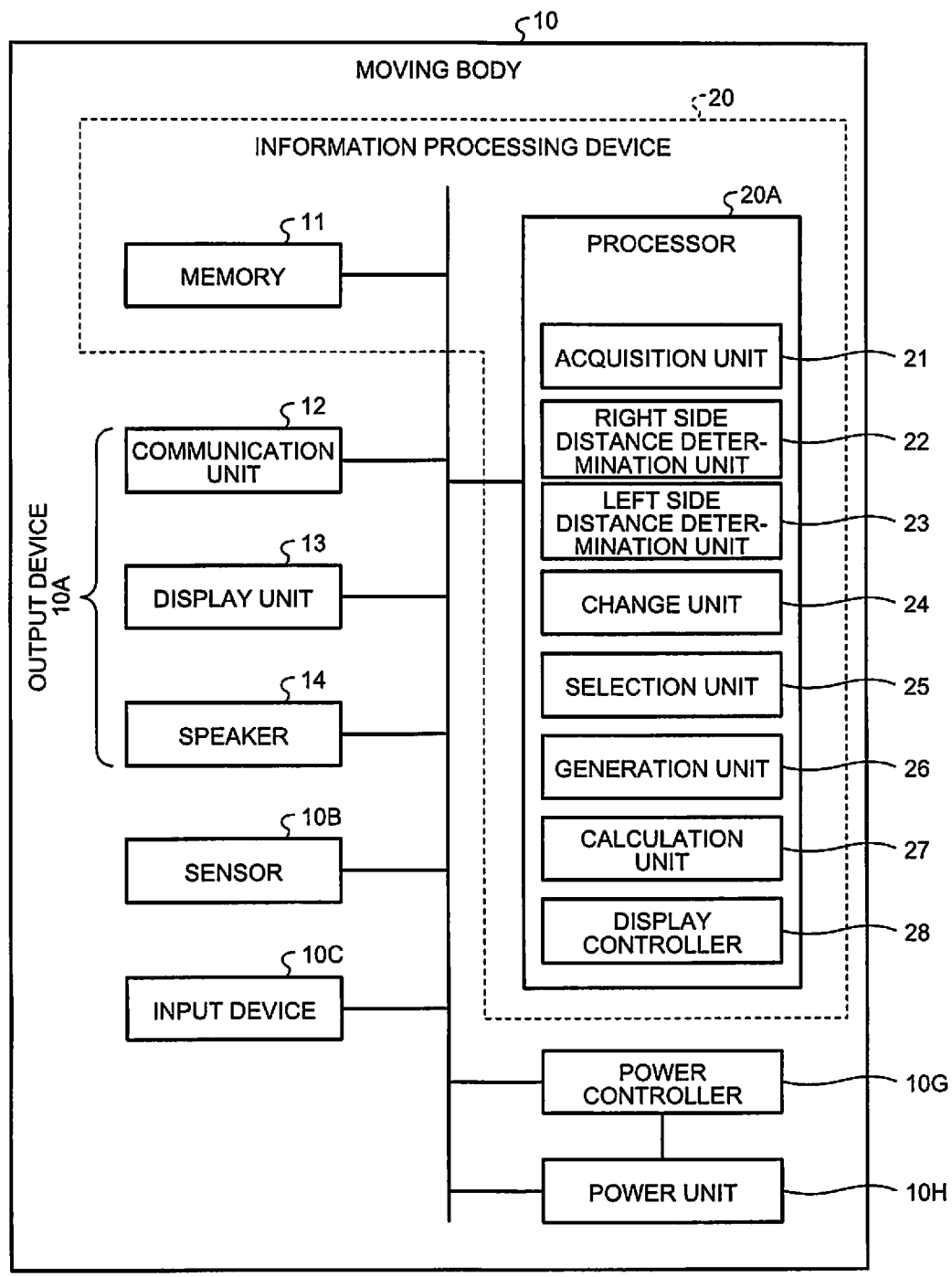
FIG. 3 is a detailed diagram illustrating exemplary structures of the moving body and an information processing device in the first embodiment.

FIG. 3 is a detailed diagram illustrating exemplary structures of the moving body 10 and the information processing device 20 in the first embodiment. The information processing device 20 in the first embodiment includes a memory 11 and a processor 20A. The processor 20A implements an acquisition unit 21, a right side distance determination unit 22, a left side distance determination unit 23, a change unit 24, a selection unit 25, a generation unit 26, a calculation unit 27, and display controller 28. The memory 11, the communication unit 12, the display unit 13, the speaker 14, the sensor 10B, the input device 10C, the power controller 10G, and the power unit 10H are coupled to one another via a bus. The power controller 10G and the power unit 10H are also coupled with a dedicated communication path interposed therebetween.

The memory 11 stores therein information. Information stored in the memory 11 is a relational expression representing a relation between the height of the separating zone and a risk of pedestrians stepping into the road, for example.

The communication unit 12 communicates with other devices. The communication with the other devices is performed to acquire road information, for example. The road information is included in a dynamic map and a high resolution map that are available in a cloud system, for example. The high resolution map is described later with reference to FIG. 13.

The display unit 13 displays information. The display unit 13 displays information indicating conditions of automatic driving of the moving body 10, for example. The display unit 13 is a liquid crystal display, for example.

The speaker 14 outputs sound. The speaker 14 outputs a voice indicating the conditions of the automatic driving of the moving body 10, for example.

The explanations of the sensor 10B, the input device 10C, the power controller 10G, and the power unit 10H are the same as those described with reference to FIG. 2. The descriptions thereof, thus, are omitted.

The acquisition unit 21 acquires the initial value of the reference path 100.

The right side distance determination unit 22 determines a right side distance that indicates a distance from the right end of the running region of the moving body 10 from right side environmental information indicating an environment on the right side of the reference path 100 referred to as a scheduled running path of the moving body 10. The right side distance indicates a distance for avoiding danger caused by the environment on the right side of the reference path 100. An example of the right side distance is described later with reference to FIG. 6.

The right side environmental information includes an object and a sign that influence a determination target (e.g., a pedestrian) for a risk of entering the running region of the moving body 10, for example.

Examples of the object that influences the determination target include the separating zone, a road facility, and a car parked on a street. Examples of the separating zone includes a guardrail separating a sidewalk from a carriage way, a curb, a planting strip, and a white line. Examples of the road facility include a pedestrian bridge and a traffic light.

Examples of the sign influencing the determination target include a road surface marking such as a pedestrian crosswalk.

The following describes examples when the objects and signs influence the determination target for a risk of entering the running region of the moving body 10. As for the pedestrian bridge, when a pedestrian feels that it is cumbersome to climb steps of the pedestrian bridge, the pedestrian may cross the road diagonally before the pedestrian bridge, for example. As for the traffic light, the pedestrian may cross the road diagonally before the traffic light when the pedestrian does not bear to wait for the light to change. As for the pedestrian crosswalk, which is marked near a place where many pedestrians cross the road, the pedestrian may cross the road diagonally before the pedestrian crosswalk when the pedestrian feels it is cumbersome to walk to the pedestrian crosswalk on the sidewalk so as to cross the road, for example. The car parked on a street used for a sidewalk blocks the sidewalk. As a result, the pedestrian may enter the carriage way to avoid the car.

The left side distance determination unit 23 determines a left side distance that indicates a distance from the left end of the running region of the moving body 10 from left side environmental information indicating an environment on the left side of the reference path 100. The explanation of the left side environmental information is the same as that of the right side environmental information. The description thereof is, thus, omitted. An example of the left side distance is described later with reference to FIG. 6.

In the example described above, both of the right side distance determination unit 22 and the left side distance determination unit 23 are used for distance determination. A lateral distance, which is any one of the right side distance and the left side distance, may be employed.

The change unit 24 changes the reference path 100 on the basis of the right side distance and the left side distance. Details of the method for changing the reference path 100 are described later with reference to the flowchart in FIG. 21.

In this example, the reference path 100 is changed on the basis of the right side distance and the left side distance. The reference path 100 may, however, be changed on the basis of one lateral distance, which is any one of the right side distance and the left side distance.

The reference path 100 may be changed on the basis of one lateral environmental information, which is any one of the right side environmental information and the left side environmental information.

The selection unit 25 determines a distance $\gamma$ indicating the position of the reference path 100 changed by the change unit 24 using a threshold and selects the reference path 100 after the change from a plurality of reference paths 100 preliminarily set.

The generation unit 26 produces a path according to the reference path 100 selected by the selection unit 25. The path includes a trajectory and a speed of the moving body 10 running on the trajectory. When an obstacle is present near the reference path 100, the generation unit 26 produces a path that avoids the obstacle.

The calculation unit 27 calculates acceleration (deceleration) for the accelerator and a steering angle so as to cause the moving body 10 to run on the path produced by the generation unit 26.

The display controller 28 displays display information including the reference path 100 on the display unit 13. Examples of the display information are described later with reference to FIGS. 28A, 28B, and 29.

The following describes an example of the determination target for a risk of entering the running region of the moving body 10 in the first embodiment.

FIG. 4 is a diagram illustrating an example of a determination target 101 in the first embodiment. In the example illustrated in FIG. 4, the determination target 101 is a pedestrian. A separating zone 102 is an object that separates the sidewalk from the running region (carriage way). In the following description, the separating zone 102 is a planting strip unless otherwise the type of the separating zone 102 is specified.

A pedestrian crosswalk 103 is provided ahead the reference path 100 of the moving body 10. The determination target 101 is present on the sidewalk side of the separating zone 102 while the moving body 10 is present on the carriage way side of the separating zone 102. A produced path length $\zeta$ indicates the length of the reference path 100 of the moving body 10. A range of the environmental information acquired for producing the reference path 100 is $\varphi_j \{j|R,L\}$. $\varphi_R$ (when j=R) indicates a range of the right side environmental information acquired from the right side of the reference path 100 of the moving body 10. $\varphi_L$ (when j=L) indicates a range of the left side environmental information acquired from the left side of the reference path 100 of the moving body 10. $\gamma^*$ indicates the distance from the left end of the running region to the initially set position of the reference path 100.

The following describes the information processing method in the first embodiment.

Example of Information Processing Method

FIG. 5 is a flowchart illustrating an example of the whole flow of the information processing method in the first embodiment. The left side distance determination unit 23 determines the left side distance $\gamma_L$ (step S1). Subsequently, the right side distance determination unit 22 determines the right side distance $\gamma_R$ (step S2). The details of the processing at steps S1 and S2 are described later with reference to the flowchart in FIG. 7.

The change unit 24 and the selection unit 25 determine the distance $\gamma$ indicating the position of the reference path 100 after the change from the left side distance $\gamma_L$ determined by the processing at step S1 and the right side distance $\gamma_R$ determined by the processing at step S2 (step S3). The details of the processing at step S3 is described later with reference to FIG. 21.

In the flowchart illustrated in FIG. 5, the distance $\gamma$ indicating the position of the reference path 100 after the change is determined from the left side distance $\gamma_L$ and the right side distance $\gamma_R$. The distance $\gamma$ indicating the position of the reference path 100 after the change may be determined by only the left side distance $\gamma_L$ or the right side distance $\gamma_R$. Such a determination of the distance $\gamma$ may be made when the running region (carriage way) is wide and the distance from the left side or the right side of the running region is sufficiently large.

FIG. 6 is a diagram for explaining exemplary variables used in the information processing in the first embodiment. rw is a value indicating the width of the running region (carriage way) of the moving body 10. In the example illustrated in FIG. 6, the left side distance $\gamma_L$ indicates the distance from the left end of the running region of the moving body 10. The right side distance $\gamma_R$ indicates the distance from the right end of the running region of the moving body 10. $\gamma'_R$ is a distance of the right side distance $\gamma_R$ indicating the distance from the left end of the running region of the moving body 10. $\gamma^*$ indicates the distance from the left end of the running region of the moving body 10 to the initially set position of the reference path 100.

FIG. 7 is a flowchart illustrating an exemplary detailed flow at steps S1 and S2. j in FIG. 7 is L or R. When j is L, the flow is the method for determining the left side distance $\gamma_L$ (the detailed flow at step S1). When j is R, the flow is the method for determining the right side distance $\gamma_R$ (the detailed flow at step S2). The following description with reference to FIG. 7 is an example where j is L for simple explanation. The processing when j is R is similar to that when j is L.

The left side distance determination unit 23 determines whether the determination target 101 is present in the range $\varphi_L$ (refer to FIG. 4) of the left side environmental information (step S11). If the determination target 101 is not present (No at step S11), the left side distance $\gamma_L$ is set to zero (step S12), and then the processing ends.

If the determination target 101 is present (Yes at step S11), the left side distance determination unit 23 calculates a distance $\alpha_L$ that indicates a moving distance for avoiding danger caused by the separating zone 102 (step S13). The distance $\alpha_L$ is represented by the distance from the left end of the running region of the moving body 10. The details of the processing at step S13 are described later with reference to the flowchart in FIG. 8.

The left side distance determination unit 23 calculates a distance $\beta_j$ that indicates a moving distance for avoiding danger caused by the object (e.g., the road facility or the car parked on a street) or the sign (e.g., the road marking) that triggers the determination target 101 to enter the running region (step S14). The distance $\beta_L$ is represented by the distance from the left end of the running region of the moving body 10. The details of the processing at step S14 is described later with reference to the flowchart in FIG. 18.

The left side distance determination unit 23 determines larger one between the distance $\alpha_L$ calculated by the processing at step S13 and the distance $\beta_L$ calculated by the processing at step S14 to be the left side distance $\gamma_L$ (step S15).

In the flowchart in FIG. 7, the distance $\gamma_L$ is determined on the basis of either larger one of the distance $\alpha_i$ and the distance $\beta_i$. The distance $\gamma_i$ may be determined by only the distance $\alpha_i$ or the distance $\beta_i$.

FIG. 8 is a flowchart illustrating an exemplary detailed flow at step S13. j in FIG. 8 is L or R. The following description with reference to FIG. 8 is an example where j is L for simple explanation. The processing when j is R is similar to that when j is L.

The left side distance determination unit 23 determines whether the separating zone 102 is present between the moving body 10 and the determination target 101 (step S21).

The following describes examples of the separating zone 102. The separating zone 102 influences riskiness of the determination target 101 such as a pedestrian entering the running region. For example, as the height of the separating zone 102 is reduced, the riskiness of the determination target 101 entering the running region is increased.

Figure 9A:
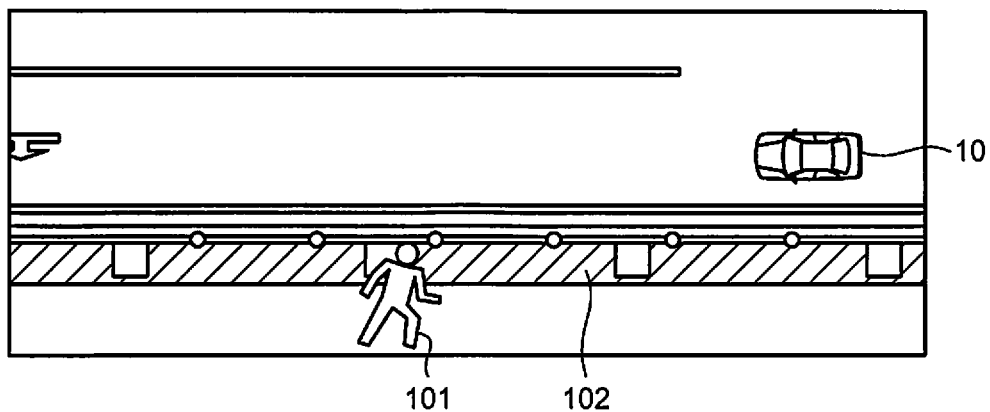
FIG. 9A is a diagram for explaining the height of a separating zone.
Figure 9B:
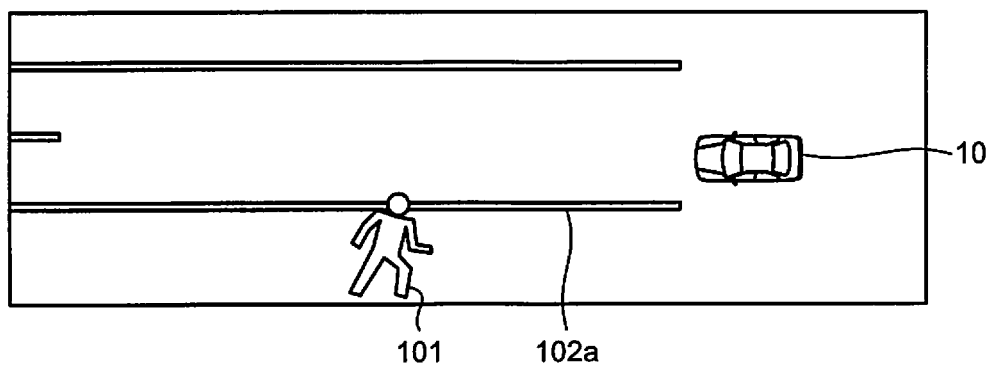
FIG. 9B is another diagram for explaining the height of another separating zone.

FIGS. 9A and 9B are diagrams for explaining the height of the separating zone. The separating zone 102 illustrated in FIG. 9A is a planting strip. A separating zone 102a illustrated in FIG. 9B is a lane line. The height of the separating zone 102a is lower than that of the separating zone 102. As a result, the riskiness of the determination target 101 entering the running region for the separating zone 102a is higher than that for the separating zone 102.

As the thickness of the separating zone 102 is reduced, the riskiness of the determination target 101 entering the running region is increased, for example.

Figure 10A:
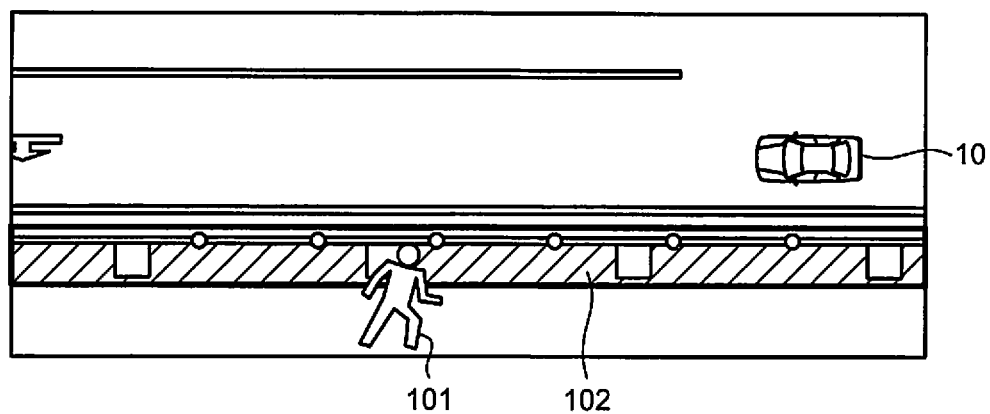
FIG. 10A is a diagram for explaining the thickness of the separating zone.
Figure 10B:
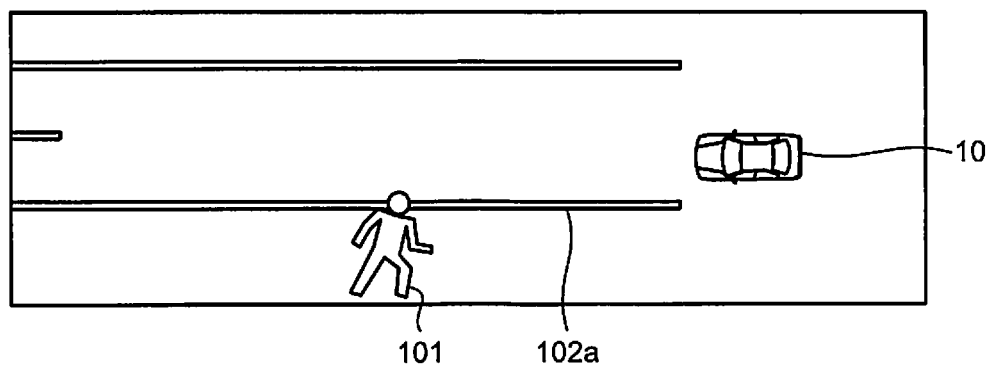
FIG. 10B is another diagram for explaining the thickness of the other separating zone.

FIGS. 10A and 10B are diagrams for explaining the thickness of the separating zone 102. The separating zone 102 illustrated in FIG. 10A is the planting strip. The separating zone 102a illustrated in FIG. 10B is the lane line. The thickness of the separating zone 102a is thinner than that of the separating zone 102. As a result, the riskiness of the determination target 101 entering the running region for the separating zone 102a is higher than that for the separating zone 102.

As an arrangement interval of the separating zone 102 is increased, the riskiness of the determination target 101 entering the running region is increased, for example.

Figure 11A:
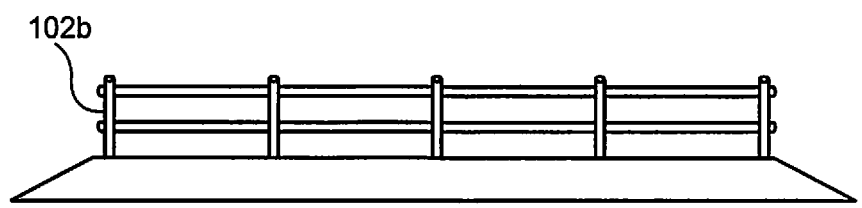
FIG. 11A is a diagram for explaining an arrangement interval of a separating zone.
Figure 11B:
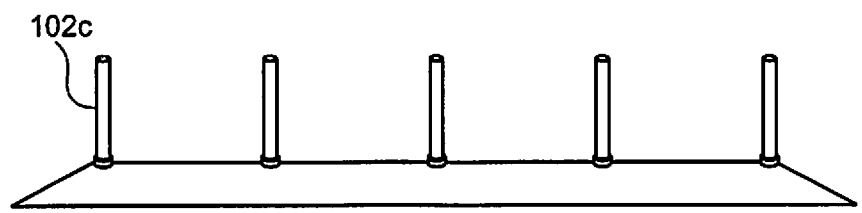
FIG. 11B is another diagram for explaining the arrangement interval of another separating zone.

FIGS. 11A and 11B are diagrams for explaining the arrangement interval of the separating zone 102. A separating zone 102b illustrated in FIG. 11A is an example of the separating zone 102 having no passable space. A separating zone 102c illustrated in FIG. 11B is an example of the separating zone 102 having a passable space. The riskiness of the determination target 101 entering the running region for the separating zone 102c having a passable space is higher than that for the separating zone 102b having no passable space.

Figure 12:
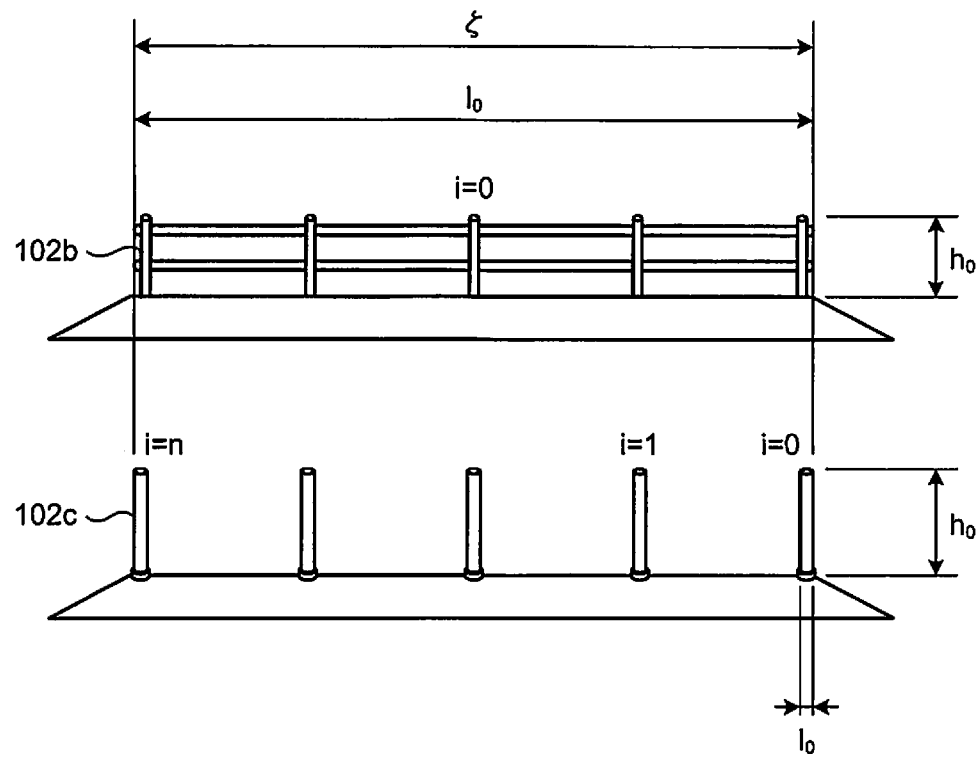
FIG. 12 is a diagram for explaining exemplary variables used in the information processing in the first embodiment.

FIG. 12 is a diagram for explaining exemplary variables used in the information processing in the first embodiment. FIG. 12 illustrates exemplary variables when the separating zone 102b and 102c are each installed in the produced path length $\zeta$.

i is a number that identifies each object included in the separating zone 102. The separating zone 102b, which has no passable space, is identified by setting the number of i to zero. In the separating zone 102c having a passable space, the individual objects (poles of the separating zone 102c) included in the separating zone 102c are identified by the numbers of 0, 1, . . . , and n (n is a natural number). $l_0$ represents the width of the zeroth separating zone 102b (102c). $h_0$ represents the height of the zeroth separating zone 102b (102c).

The information about the separating zone 102 as illustrated in FIG. 12 can be acquired from the high resolution map, for example.

Figure 13:
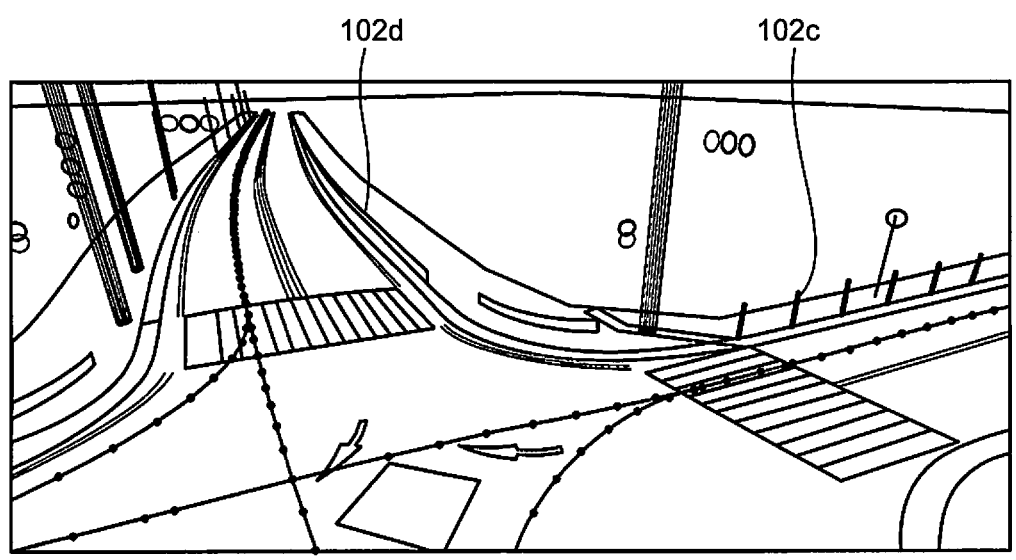
FIG. 13 is a diagram illustrating an exemplary high resolution map.

FIG. 13 is a diagram illustrating an exemplary high resolution map. The example illustrated in FIG. 13 includes the information indicating the separating zone 102c and a separating zone 102d. The separating zone 102c is composed of a plurality of poles. The separating zone 102d is the curb separating the running region from the sidewalk.

Referring back to FIG. 8, if the separating zone 102 is not present (No at step S21), the left side distance determination unit 23 sets the height $h_i$ of the separating zone 102 to zero (refer to FIG. 12) and sets the thickness $w_i$ of the separating zone 102 to zero (refer to FIG. 15) (step S22). The processing then proceeds to step S23.

If the separating zone 102 is present (Yes at step S21), the left side distance determination unit 23 calculates an entering ease $\eta_{hL}$ caused by the height of the separating zone 102 (step S23). As illustrated in FIG. 12, the arrangement interval of the separating zone 102 has variations. When the separating zone 102c is installed, the determination target 101 can enter the running region from the passable space of the separating zone 102c. For calculating $\eta_{hj}$, an average height $\overline{h}_j$ of the separating zone 102 is used. In the calculation by the left side distance determination unit 23, j is L while in the calculation by the right side distance determination unit 22, j is R.

The average height $\overline{h}_j$ is defined by expression (1). Variables used in expression (1) are defined by expressions (2) and (3).

$$\overline{h}_j = \frac{s_{hj}}{\zeta_j} \quad (1)$$

$$s_{hj} = \sum_{i=0}^{n} s_{hji} \quad (2)$$

$$s_{hji} = h_i \times l_i \quad (3)$$

As described above, $h_i$ and $l_i$ can be acquired from the high resolution map (refer to FIG. 13). When the high resolution map is not available, the left side distance determination unit 23 estimates the shape ($h_i$ and $l_i$) of the separating zone 102 from sensor data obtained near the road shoulder, for example. When the separating zone 102 is the road marking such as the lane line, the left side distance determination unit 23 sets $h_i$ to zero.

The entering ease $\eta_{hj}$ caused by the height of the separating zone 102 is obtained from $\overline{h}_j$ by expression (4). In the calculation by the left side distance determination unit 23, j is L while in the calculation by the right side distance determination unit 22, j is R.

$$\eta_{hj} = \frac{1}{1 + e^{-\varepsilon_h(\overline{h}_j + \lambda_h)}} \quad (4)$$

$\varepsilon_h$ and $\lambda_h$ that are included in expression (4) are $\varepsilon_h=-18$ and $\lambda_h=-0.3$, respectively, for example.

Figure 14:
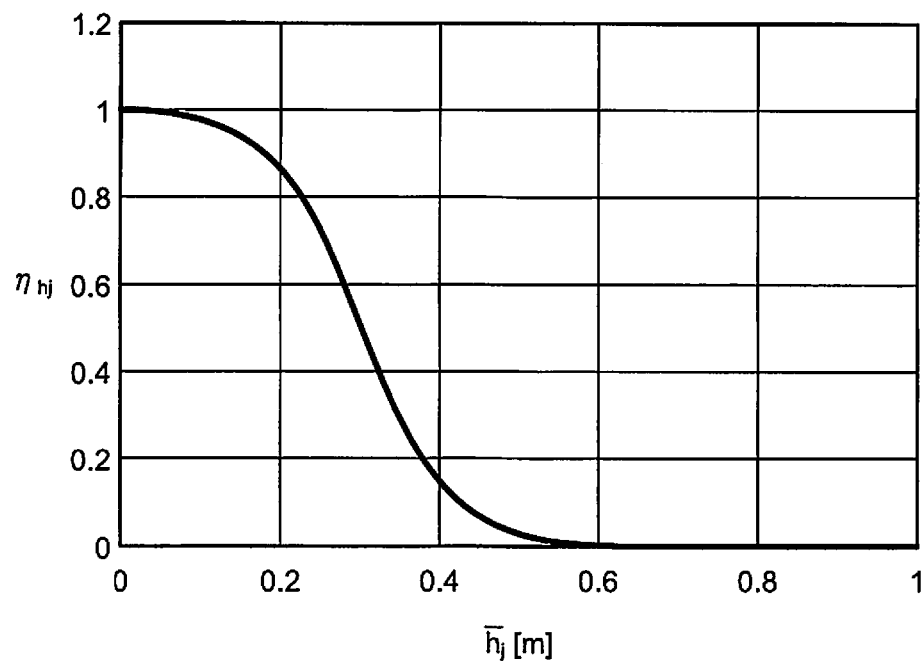
FIG. 14 is a graph illustrating an example of a function $\eta_{hj}$ in the first embodiment.

FIG. 14 is a graph illustrating an example of a function $\eta_{hj}$ in the first embodiment. On the basis of the function $\eta_{hj}$ having the shape illustrated in FIG. 14, the entering ease $\eta_{hj}$ caused by the height of the separating zone 102 is calculated using the average height $\overline{h}_j$.

The left side distance determination unit 23 calculates an entering ease $\eta_{wL}$ caused by the thickness of the separating zone 102 (step S24).

Figure 15:
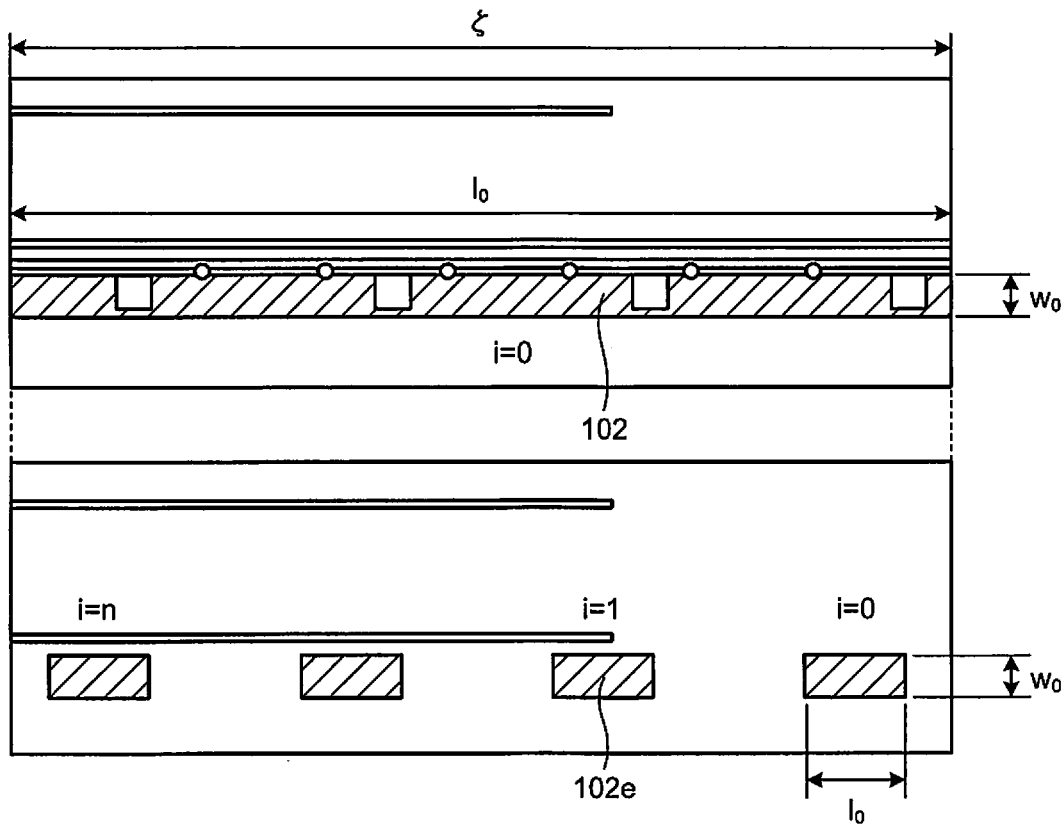
FIG. 15 is a diagram for explaining exemplary variables used in the information processing in the first embodiment.

FIG. 15 is a diagram for explaining exemplary variables used in the information processing in the first embodiment. i is a number that identifies each object included in the separating zone 102. When the separating zone 102 having no passable space is installed, the separating zone 102 is identified by setting the number of i to zero. When a separating zone 102e having a passable space is installed, the individual objects (individual planting strips of the separating zone 102e) included in the separating zone 102e are identified by the numbers of 0, 1, . . . , and n (n is a natural number). $l_0$ represents the width of the zeroth separating zone 102 (102e). $w_0$ represents the thickness of the zeroth separating zone 102 (102e).

The information about the separating zone 102 as illustrated in FIG. 15 can be acquired from the high resolution map (refer to FIG. 13), for example.

Referring back to FIG. 8, at step S24, in the same reason as that at step S23, an average thickness $\overline{w}_j$ of the separating zone 102 is used for calculating the entering ease $\eta_{wj}$. In the calculation by the left side distance determination unit 23, j is L while in the calculation by the right side distance determination unit 22, j is R.

The average thickness $\overline{w}_j$ is defined by expression (5). Variables used in expression (5) are defined by expressions (6) and (7).

$$\overline{w}_j = \frac{s_{wj}}{\zeta} \quad (5)$$

$$s_{wj} = \sum_{i=0}^{n} s_{wij} \quad (6)$$

$$s_{wij} = w_i \times l_i \quad (7)$$

As described above, $w_i$ and $l_i$ can be acquired from the high resolution map (refer to FIG. 13). The left side distance determination unit 23 estimates the shape ($w_i$ and $l_i$) of the separating zone 102 from sensor data obtained near the road shoulder, for example.

The entering ease $\eta_{wj}$ caused by the thickness of the separating zone 102 is obtained from $\overline{w}_j$ by expression (8). In the calculation by the left side distance determination unit 23, j is L while in the calculation by the right side distance determination unit 22, j is R.

$$\eta_{wj} = \frac{1}{1 + e^{-\varepsilon_w(\overline{w}_j + \lambda_w)}} \quad (8)$$

$\varepsilon_w$ and $\lambda_w$ that are included in expression (8) are $\varepsilon_w=-18$ and $\lambda_w=-0.4$, respectively, for example.

Figure 16:
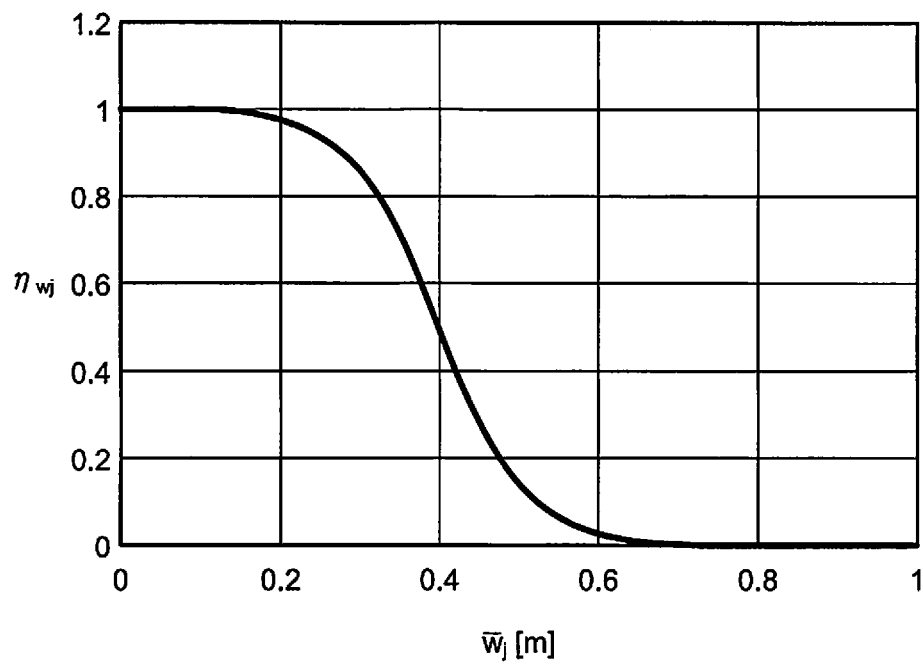
FIG. 16 is a graph illustrating an example of a function $\eta_{wj}$ in the first embodiment.

FIG. 16 is a graph illustrating an example of a function in the first embodiment. On the basis of the function $\eta_{wj}$ having the shape illustrated in FIG. 16, the entering ease $\eta_{wj}$ caused by the thickness of the separating zone 102 is calculated using the average thickness $\overline{w}_j$.

Referring back to FIG. 8, the left side distance determination unit 23 calculates a running region entering ease $\eta_L$ (step S25). Specifically, the running region entering ease $\eta_L$ is calculated by expression (9) where j is L. The running region entering ease $\eta_L$ is an average of $\eta_{hj}$ and $\eta_{wj}$.

$$\eta_j = \frac{\eta_{hj} + \eta_{wj}}{2} \quad (9)$$

The left side distance determination unit 23 calculates an influence rate $\xi$ when the moving body 10 collides against the determination target 101 (step S26). Damage of the determination target 101 when the moving body 10 collides against the determination target 101 such as a pedestrian is increased as the speed of the moving body 10 is increased. The moving body 10, thus, needs to run further apart from the determination target 101 as the speed of the moving body 10 is increased. The influence rate $\xi$ in the collision is defined by expression (10).

$$\xi = \frac{1}{1 + e^{-\varepsilon_v(v+\lambda_v)}} \quad (10)$$

$\varepsilon_v$ and $\lambda_v$ that are included in expression (10) are $\varepsilon_v=0.4$ and $\lambda_v=-15$, respectively, for example.

Figure 17:
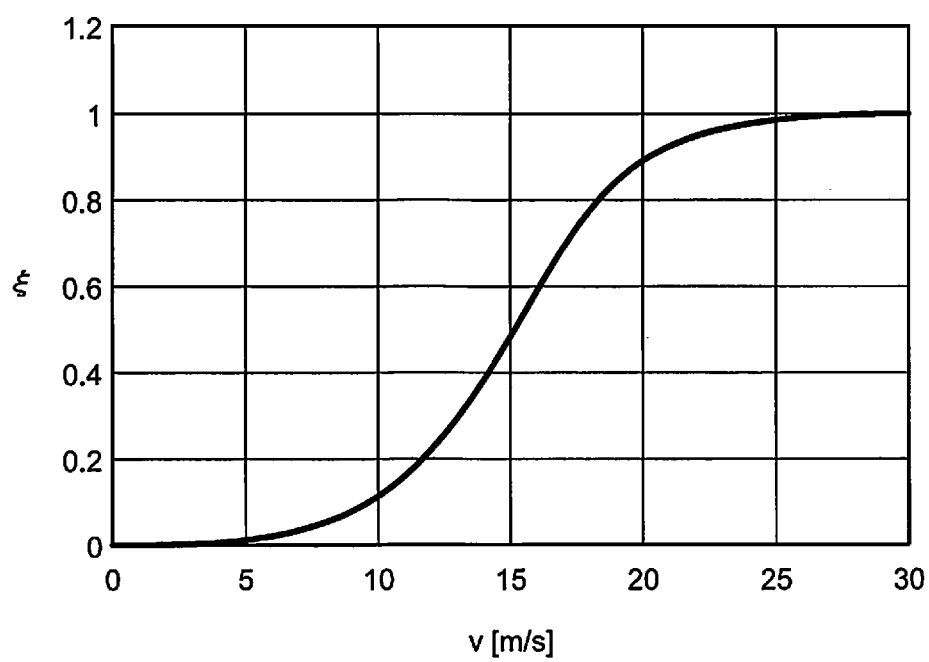
FIG. 17 is a graph illustrating an example of a function $\xi$ in the first embodiment.

FIG. 17 is a graph illustrating an example of a function $\xi$ in the first embodiment. On the basis of the function $\xi$ having the shape illustrated in FIG. 17, the influence rate $\xi$ in the collision is calculated using a speed v of the moving body.

Referring back to FIG. 8, the left side distance determination unit 23 calculates the distance $\alpha_L$ that indicates a moving distance for avoiding danger caused by the separating zone 102 (step S27). Specifically, the distance $\alpha_L$ is calculated by expression (11) where j is L. The left side distance determination unit 23 calculates the distance $\alpha_L$ on the basis of a product of the running region entering ease $\eta_L$ and the influence rate $\xi$ in the collision.

$$\alpha_j = \omega_{\alpha j}(\eta_j \times \xi) \quad (11)$$

where $\omega_{\alpha j}$ is a conversion coefficient for converting a unit of the distance into meter (m).

Figure 18:
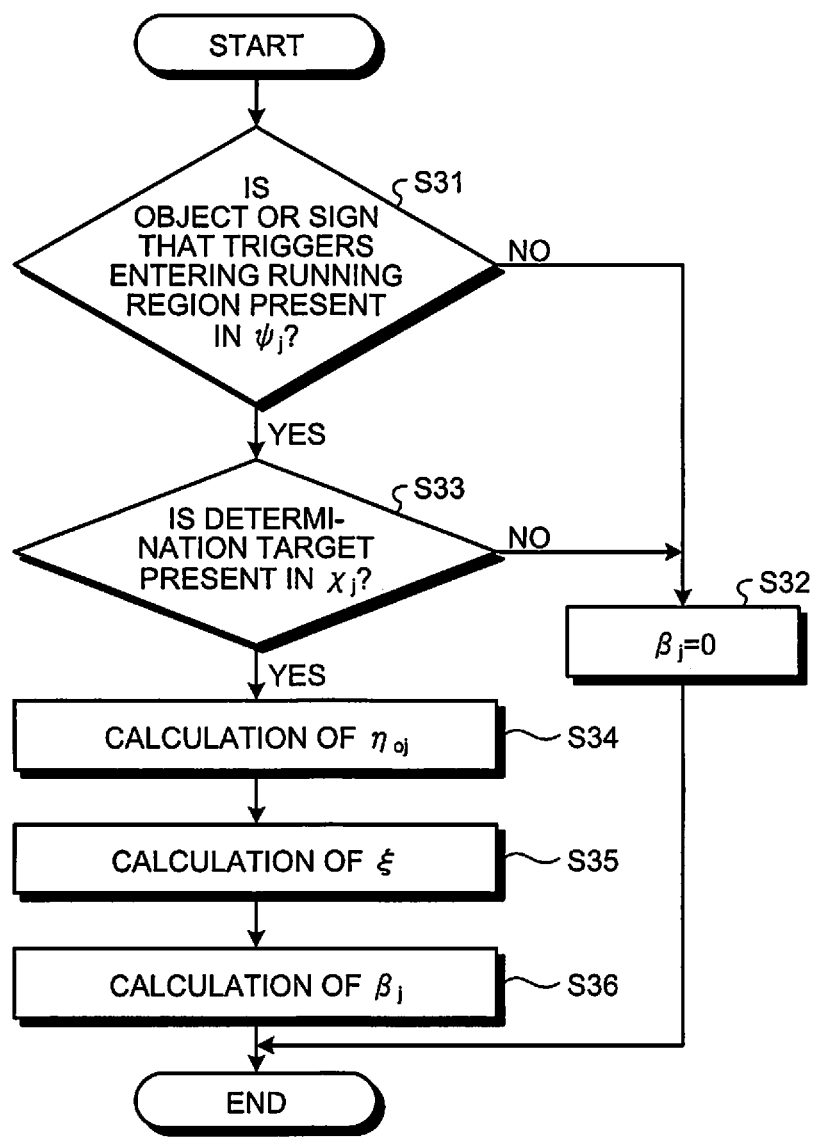
FIG. 18 is a flowchart illustrating an exemplary detailed flow at step S14.

FIG. 18 is a flowchart illustrating an exemplary detailed flow at step S14. j in FIG. 18 is L or R. The following description with reference to FIG. 18 is an example where j is L for simple explanation. The processing when j is R is similar to that when j is L.

The left side distance determination unit 23 determines whether an object or a sign that triggers entering the running region is present in the range $\varphi_L$ of the left side environmental information (step S31). Specifically, the left side distance determination unit 23 determines whether an object or a sign that triggers entering the running region is present in the range $\varphi_L$ of the left side environmental information from information acquired from the high resolution map (refer to FIG. 13) and the sensor 10B, for example.

If an object or a sign that triggers entering the running region is not present (No at step S31), the left side distance determination unit 23 sets the distance $\beta_L$ indicating a moving distance for avoiding danger caused by the object or the sign that triggers entering the running region to zero (step S32).

If an object or a sign that triggers entering the running region is present (Yes at step S31), the left side distance determination unit 23 determines whether the determination target 101 is present in a left side peripheral region $\chi_L$ of the object or the sign (step S33).

If the determination target 101 is not present in the left side peripheral region $\chi_L$ (No at step S33), the processing proceeds to step S32 in the same manner as the negative determination at step S31.

If the determination target 101 is present in the left side peripheral region $\chi_L$ (Yes at step S33), the left side distance determination unit 23 calculates an entering ease lot caused by the object or the sign that triggers entering the running region (step S34). The left side distance determination unit 23 calculates the entering ease $\eta_{oL}$ caused by the object or the sign with reference to a list of constants $\eta_o$ specified for each of the objects and the signs that trigger entering the running region, for example.

FIG. 19 is a table illustrating an exemplary list of the constants $\eta_o$ in the first embodiment. In the exemplary list illustrated in FIG. 19, the constant $\eta_o$, which indicates the ease of the determination target 101 entering the running region, is 0.2 when the object or the sign is the pedestrian crosswalk 103. When the object or the sign is a car parked on the sidewalk, the constant $\eta_o$, which indicates the ease of the determination target 101 entering the running region, is 0.4. Any method may be used for determining the constant $\eta_o$. For example, the constant $\eta_o$ may be determined by the developer. For another example, the constant $\eta_o$ may be determined on the basis of a learning result on an image of the determination target 101 such as a pedestrian stepping into the running region.

When the value of the constant $\eta_o$ is changed in a case where the determination target 101 is present in the left side peripheral region $\chi_L$ or in a case where the determination target 101 is present in a right side peripheral region $\chi_R$, $\eta_o$ in FIG. 19 may be set to $\eta_{oj}$. In this case, j is L or R. When j is L, $\eta_{oL}$ indicates a value in a case where the determination target 101 is present in the left side peripheral region $\chi_L$. When j is R, $\eta_{oR}$ indicates a value in a case where the determination target 101 is present in the right side peripheral region $\chi_R$.

Figure 20:
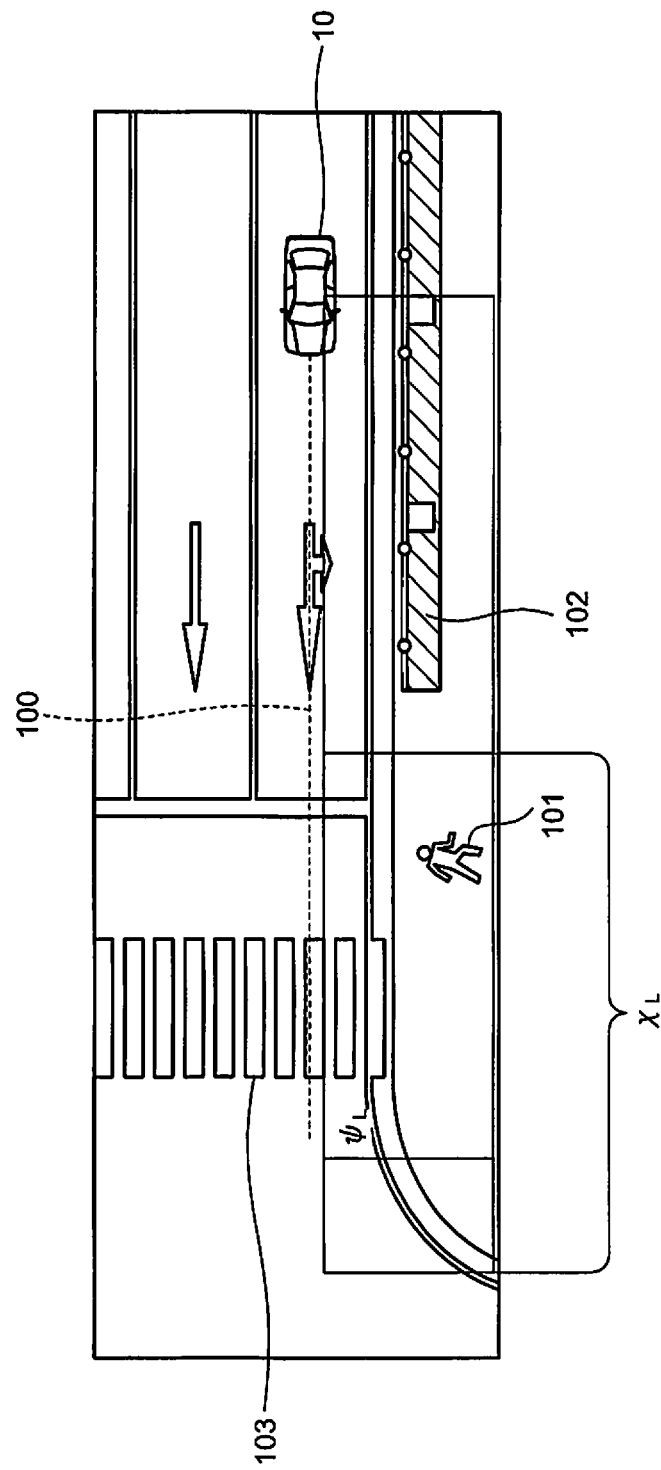
FIG. 20 is a diagram illustrating an example of a range $\varphi_L$ of left side environmental information and a left side peripheral region $\chi_L$ in the first embodiment.

FIG. 20 is a diagram illustrating an example of the range $\varphi_L$ of the left side environmental information and the left side peripheral region $\chi_L$ in the first embodiment. In the example illustrated in FIG. 20, the sign that triggers entering the running region is the pedestrian crosswalk 103. The determination target 101 present in the left side peripheral region $\chi_L$ of the pedestrian crosswalk 103 can be detected in the region (overlapping region) where the range $\varphi_L$ of the left side environmental information and the left side peripheral region $\chi_L$ overlap with each other.

Referring back to FIG. 18, the left side distance determination unit 23 calculates the influence rate $\xi$ when the moving body 10 collides against the determination target 101 (step S35). The explanation of the influence rate $\xi$ is the same as that described with reference to FIG. 8. The description thereof is, thus, omitted.

The left side distance determination unit 23 calculates the distance $\beta_L$ indicating a moving distance for avoiding danger caused by the object or the sign that triggers entering the running region (step S36). Specifically, the distance $\beta_L$ is calculated by expression (12) where j is L. The left side distance determination unit 23 calculates the distance $\beta_L$ on the basis of a product of the running region entering ease $\eta_{oL}$ and the influence rate $\xi$ in the collision.

$$\beta_j = \omega_{\beta j}(\eta_{oj} \times \xi) \quad (12)$$

where $\omega_{\beta j}$ is a conversion coefficient for converting a unit of the distance into meter (m).

Figure 21:
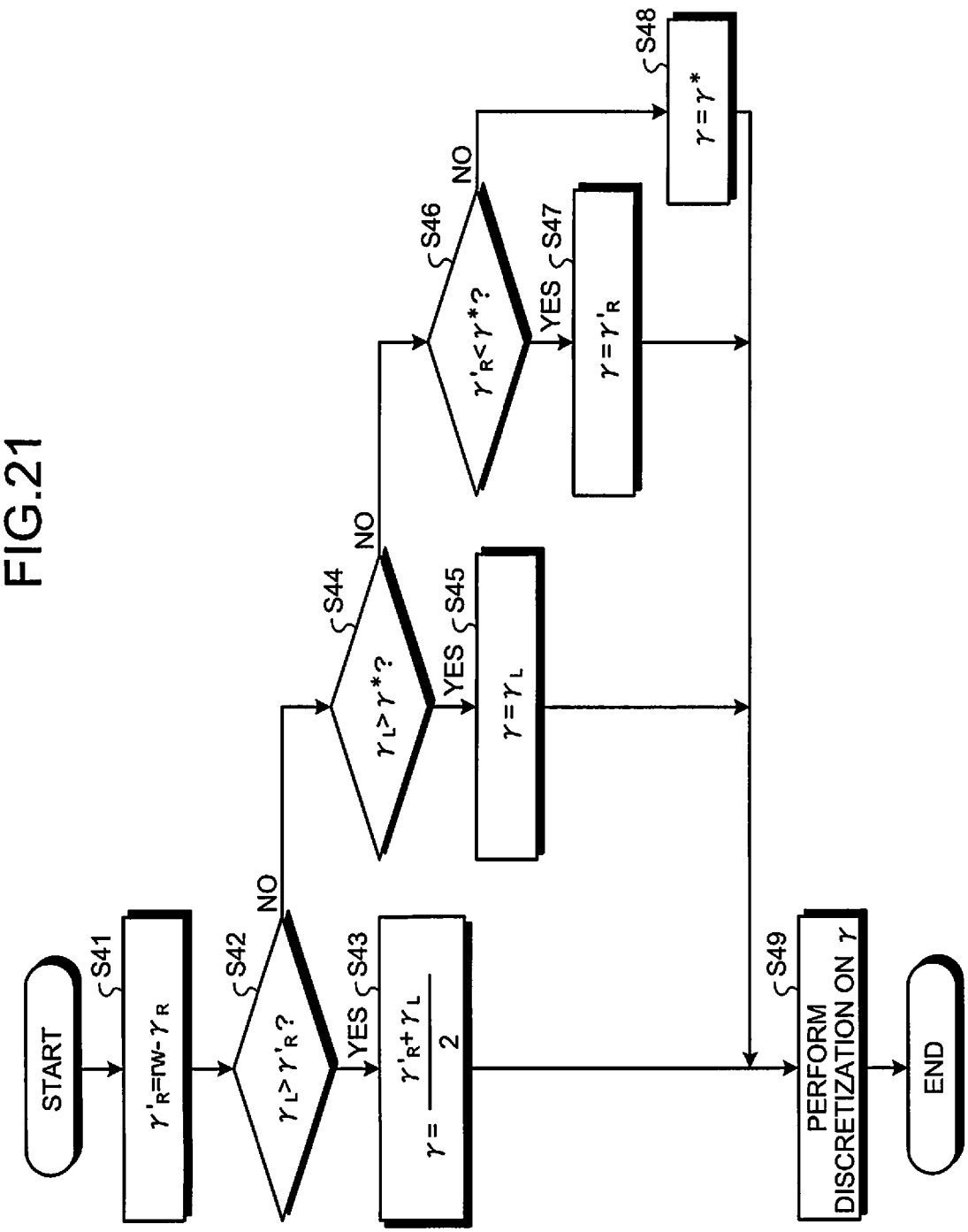
FIG. 21 is a flowchart illustrating an exemplary detailed flow at step S3.

FIG. 21 is a flowchart illustrating an exemplary detailed flow at step S3. The change unit 24 calculates the distance $\gamma'_R$ by subtracting the right side distance $\gamma_R$ from the value rw indicating the width of the running region (carriage way) of the moving body 10 (step S41).

Figure 22:
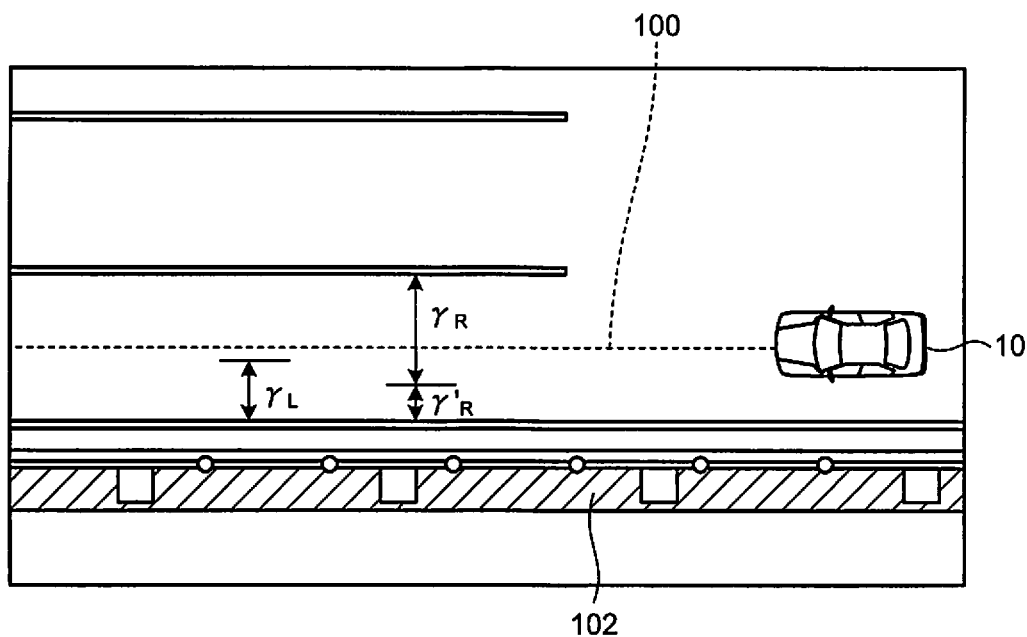
FIG. 22 is a diagram illustrating an example where a left side distance $\gamma_L$ and a right side distance $\gamma_R$ overlap with each other.

The change unit 24 determines whether the left side distance $\gamma_L$ and the right side distance $\gamma_R$ overlap with each other (step S42). Specifically, the change unit 24 determines whether $\gamma_L$ is larger than $\gamma'_R$. FIG. 22 illustrates an example where the left side distance $\gamma_L$ and the right side distance $\gamma_R$ overlap with each other.

Referring back to FIG. 21, if the left side distance $\gamma_L$ and the right side distance $\gamma_R$ overlap with each other (Yes at step S42), the change unit 24 changes the distance $\gamma$ indicating the position of the reference path 100 to a median $((\gamma'_R+\gamma_L)/2)$ (step S43).

When the distance $\gamma$ is changed to the median, a distance between the determination target 101 such as a pedestrian present in the left or the right of the running region and the moving body 10 is shorter than an ideal distance necessary for avoiding danger. The calculation unit 27, thus, calculates deceleration (deceleration amount) to decelerate the speed of the moving body 10. The deceleration is acquired from a lookup table in which the deceleration and a difference between the median and the ideal distance are in associated with each other, for example. As the difference between the median and the ideal distance is increased, the deceleration is increased, for example.

Figure 23:
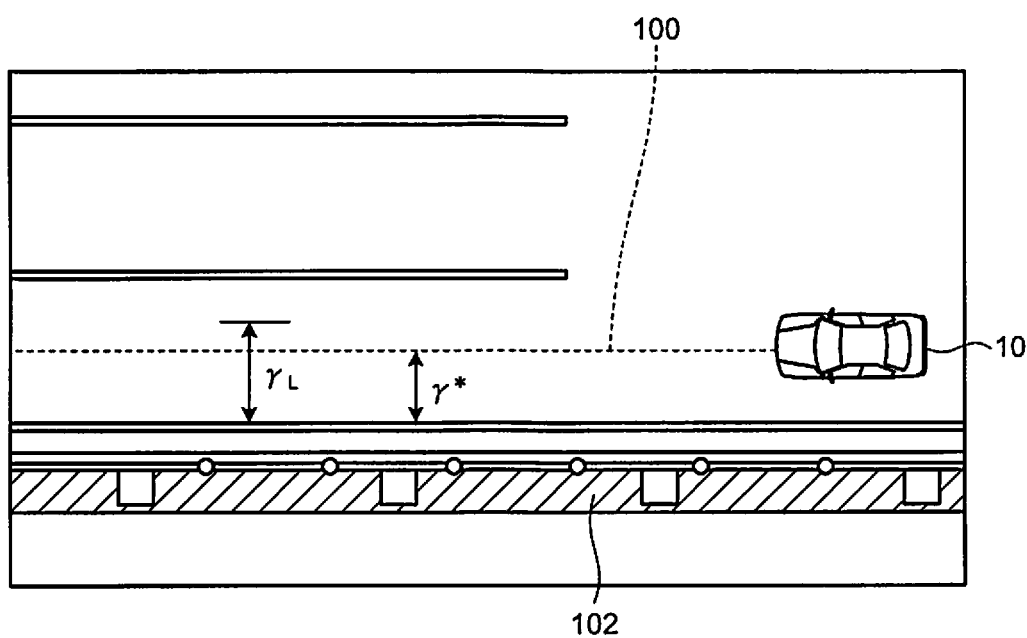
FIG. 23 is a diagram illustrating an example where $\gamma_L$ is larger than $\gamma^*$.

If the left side distance $\gamma_L$ and the right side distance $\gamma_R$ do not overlap with each other (No at step S42), the change unit 24 determines whether the left side distance $\gamma_L$ is larger than the distance from the left end to the center of the running region (step S44). In the first embodiment, $\gamma^*$ is the distance from the left end to the center of the running region. Specifically, the change unit 24, thus, determines whether $\gamma_L$ is larger than $\gamma^*$. FIG. 23 illustrates an example where $\gamma_L$ is larger than $\gamma^*$.

Referring back to FIG. 21, if the left side distance $\gamma_L$ is larger than the distance from the left end to the center of the running region (Yes at step S44), the change unit 24 changes the distance $\gamma$ indicating the position of the reference path 100 to the left side distance $\gamma_L$ (step S45).

Figure 24:
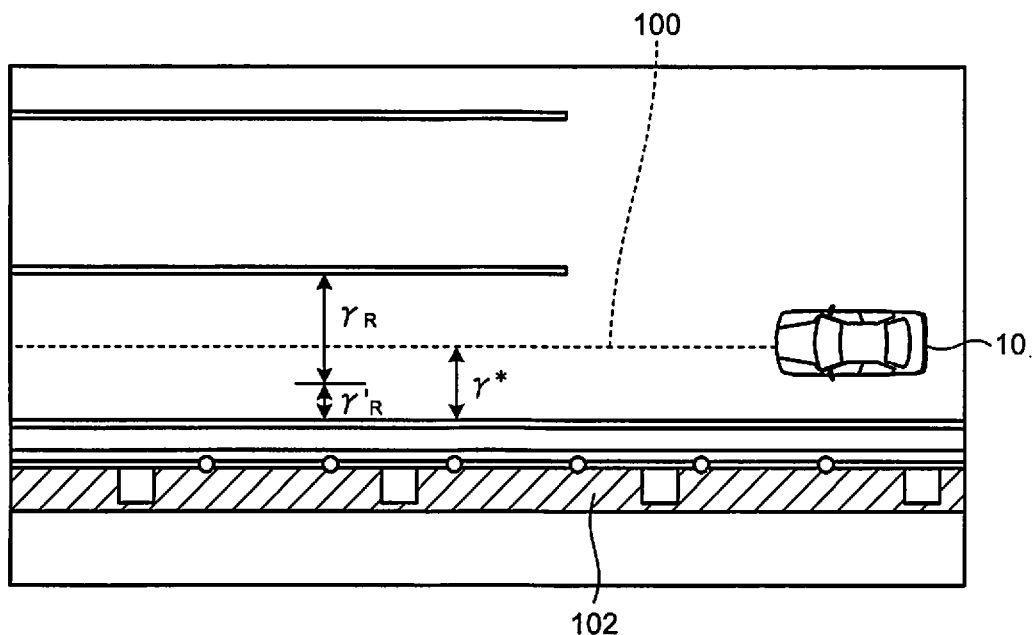
FIG. 24 is a diagram illustrating an example where $\gamma_R$ is smaller than $\gamma^*$.

If the left side distance $\gamma_L$ is not larger than the distance from the left end to the center of the running region (No at step S44), the change unit 24 determines whether the right side distance $\gamma_R$ is larger than the distance from the left end to the center of the running region (step S46). Specifically, the change unit 24, thus, determines whether $\gamma'_R$ is smaller than $\gamma^*$. FIG. 24 illustrates an example where $\gamma'_R$ is smaller than $\gamma^*$.

Referring back to FIG. 21, if the right side distance $\gamma_R$ is larger than the distance from the left end to the center of the running region (Yes at step S46), the change unit 24 changes the distance $\gamma$ indicating the position of the reference path 100 to the distance $\gamma'_R$ (corresponding to the position at the right side distance $\gamma_R$) (step S47).

Figure 25:
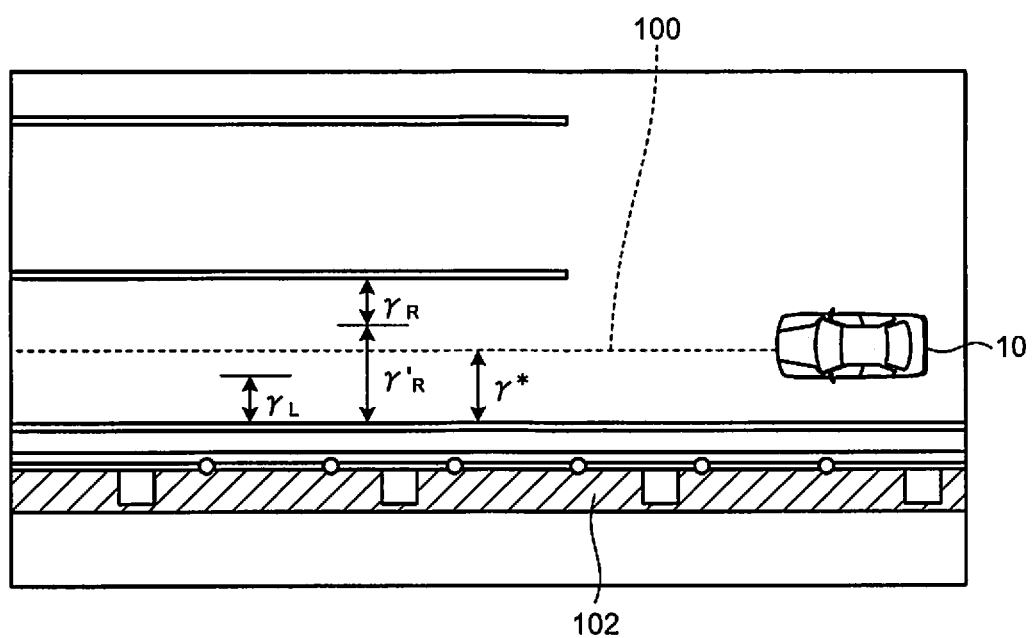
FIG. 25 is a diagram illustrating an example where the left side distance $\gamma_L$ and the right side distance $\gamma_R$ do not exceed the center of a running region.

If the right side distance $\gamma_R$ is not larger than the distance from the left end to the center of the running region (No at step S46), the change unit 24 does not change the distance $\gamma$ ($=\gamma^*$) indicating the position of the reference path 100 (step S48). When the left side distance $\gamma_L$ and the right side distance $\gamma_R$ do not exceed the center of the running region, the change unit 24 does not change the position of the reference path 100. FIG. 25 illustrates an example where the left side distance $\gamma_L$ and the right side distance $\gamma_R$ do not exceed the center of the running region.

The selection unit 25 performs discretization on the distances $\gamma$ as a result of being continuously changed by the change unit 24 (step S49). Specifically, the selection unit 25 performs determination on the distance $\gamma$ that indicates the position of the reference path 100 and is changed by the change unit 24 using a threshold to select the reference path 100 after the change from a plurality of preliminarily set reference paths 100. The following describes a reason why the distance $\gamma$ is subjected to the discretization.

Figure 26:
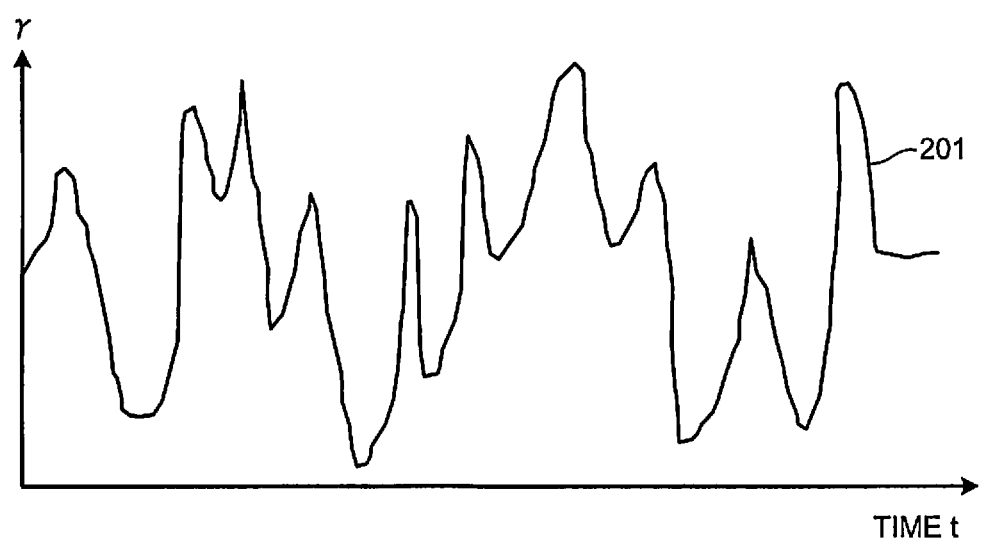
FIG. 26 is a diagram illustrating exemplary fluctuation of a distance $\gamma$ in the first embodiment.

FIG. 26 is a diagram illustrating exemplary fluctuation of the distance $\gamma$ in the first embodiment. The change unit 24 calculates the distance $\gamma$ every certain period so as to correspond to the movement of the moving body 10. As a result of the calculation of the distance $\gamma$ performed at every certain period, as illustrated in FIG. 26, the value of the distance $\gamma$ (201) fluctuates. If the moving body 10 follows the distance $\gamma$ that continuously fluctuates, the moving body 10 runs in zigzag directions. For preventing the zigzag running, the selection unit 25 performs the discretization on the distance $\gamma$ by allocating the distance $\gamma$ into one of set values.

Figure 27A:
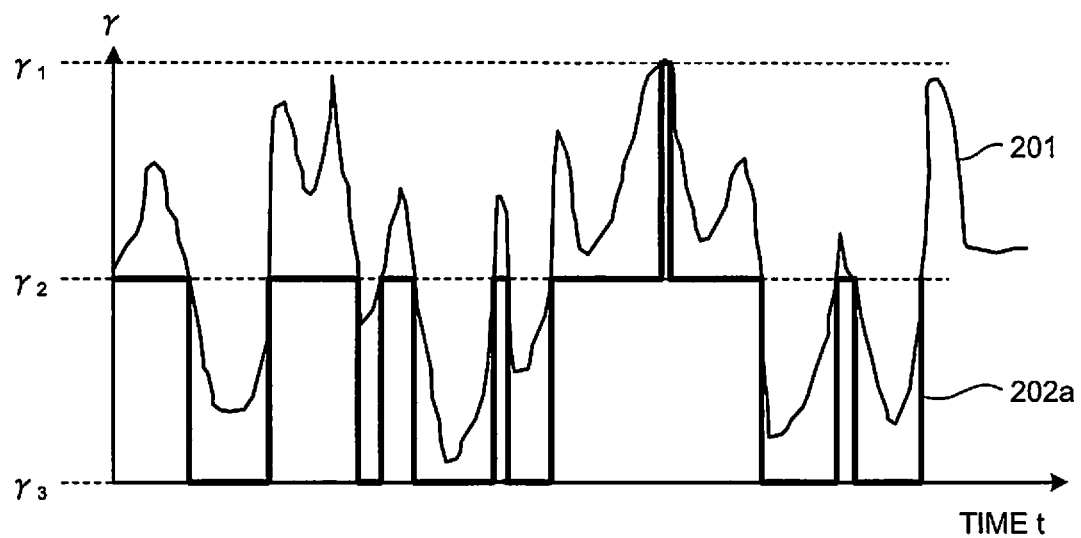
FIG. 27A is a diagram illustrating a first example where the distance $\gamma$ in the first embodiment is subjected to discretization.

FIG. 27A is a diagram illustrating a first example where the distance $\gamma$ is subjected to the discretization in the first embodiment. FIG. 27A illustrates the example where distances $\gamma_1$, $\gamma_2$, and $\gamma_3$ are selected on the basis of the distance $\gamma$ (201). FIG. 27A illustrates the example where a discretized distance $\gamma$ (202a) is obtained using a single threshold for the determination of each of the distances $\gamma_1$, $\gamma_2$, and $\gamma_3$.

Figure 27B:
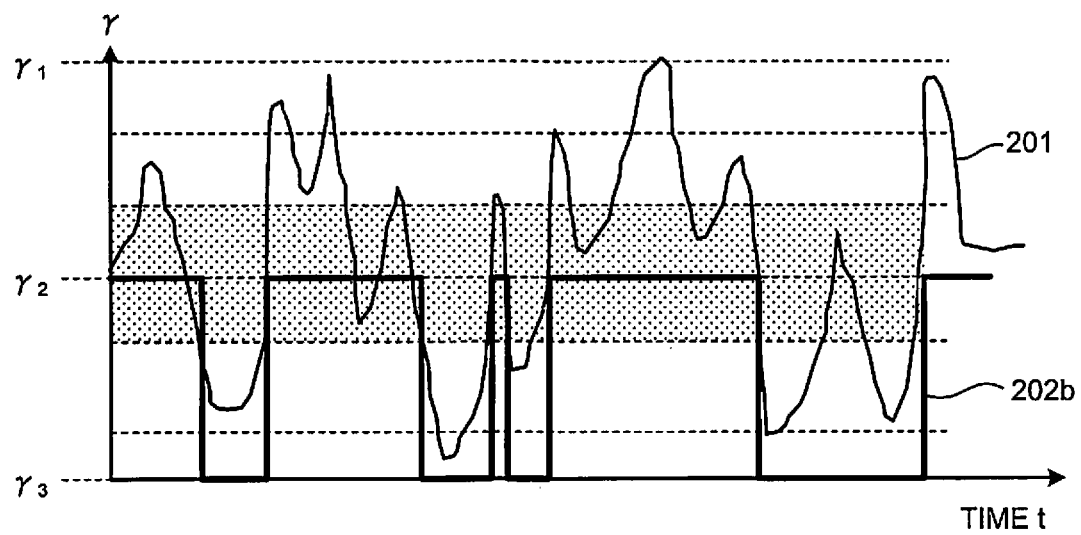
FIG. 27B is a diagram illustrating a second example where the distance $\gamma$ in the first embodiment is subjected to the discretization.

FIG. 27B is a diagram illustrating a second example where the distance $\gamma$ is subjected to the discretization in the first embodiment. FIG. 27B illustrates the example where distances $\gamma_1$, $\gamma_2$, and $\gamma_3$ are selected on the basis of the distance $\gamma$ (201) in the same manner as FIG. 27A. FIG. 27B illustrates the example where a discretized distance $\gamma$ (202b) is obtained using two thresholds (hysteresis threshold) for the determination of each of the distances $\gamma_1$, $\gamma_2$, and $\gamma_3$. The example of the discretization illustrated in FIG. 27B uses an idea of a Schmitt trigger circuit. The number of fluctuations in the discretized distance $\gamma$ in the second example illustrated in FIG. 27B is smaller than that in the first example illustrated in FIG. 27A. The selection unit 25 in the first embodiment performs the discretization on the distance $\gamma$ by the method illustrated in FIG. 27B.

In the first embodiment, the selection unit 25 is included. The distance $\gamma$ obtained by the change unit 24 may be directly used without including the selection unit 25.

The following describes examples of the display information including the reference path 100. The reference path 100 selected by the selection unit 25 is displayed on the display unit 13 by the display controller 28.

Examples of Display Information

Figure 28A:
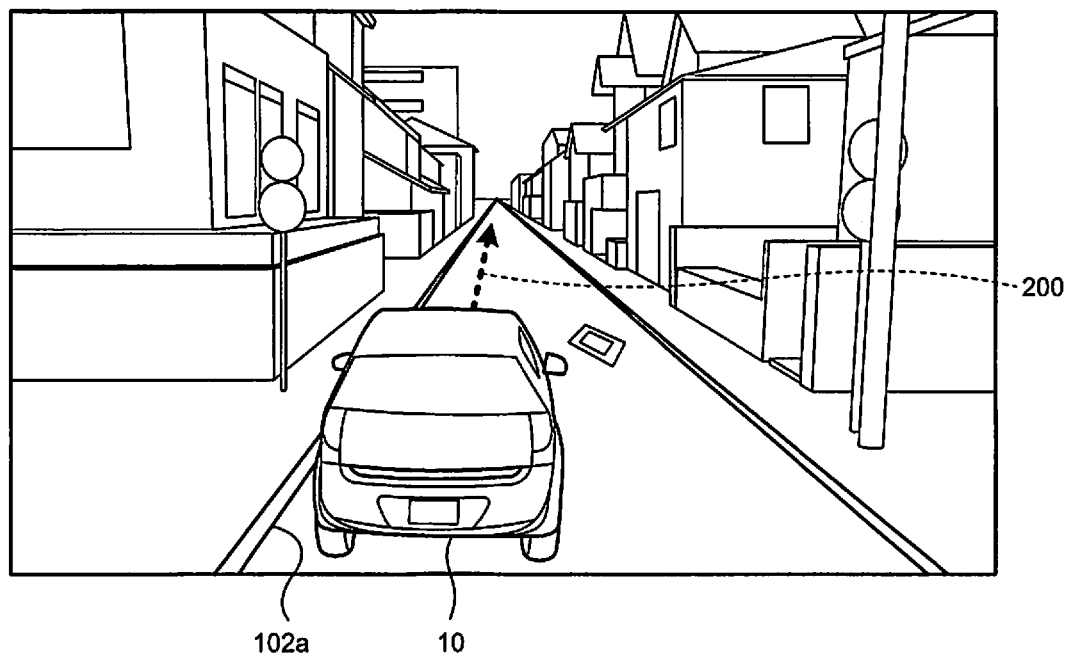
FIG. 28A is a diagram illustrating a first example of display information displayed in a three-dimensional (3D) manner in the first embodiment.

FIG. 28A is a diagram illustrating a first example of the display information displayed in a three-dimensional (3D) manner in the first embodiment. The first example of the display information illustrated in FIG. 28A is the display information displayed on the display unit 13 by the display controller 28 when the determination target 101 such as a pedestrian is not present. FIG. 28A illustrates a path 200 serving as the reference path 100 of the moving body 10.

Figure 28B:
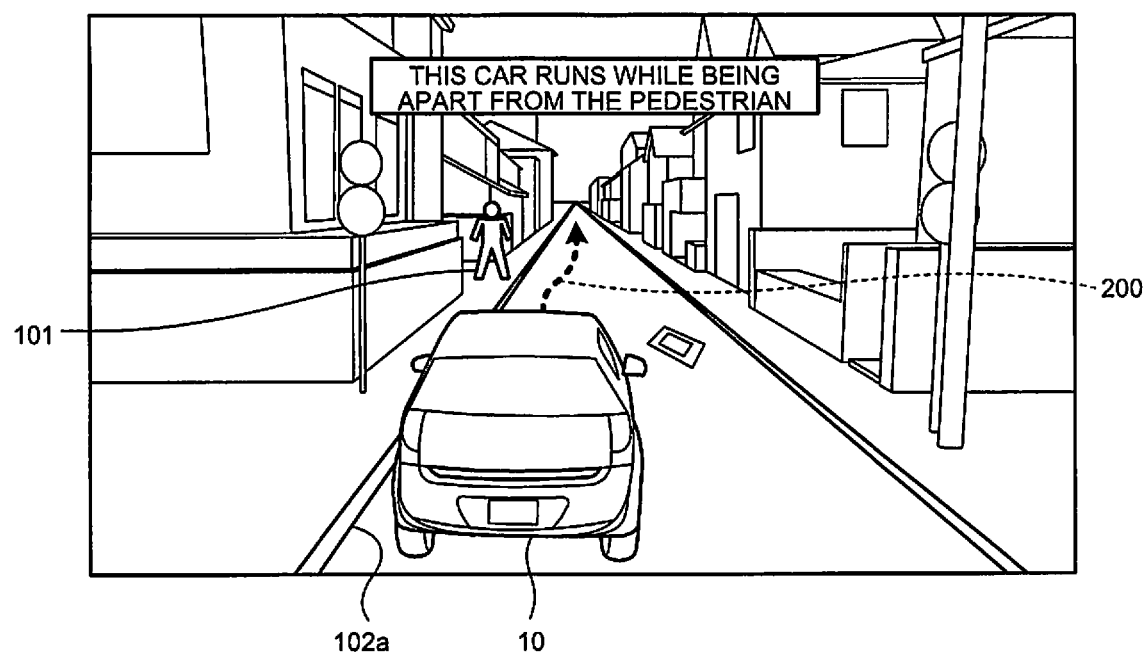
FIG. 28B is a diagram illustrating a second example of the display information displayed in a 3D manner in the first embodiment.

FIG. 28B is a diagram illustrating a second example of the display information displayed in a 3D manner in the first embodiment. The second example of the display information illustrated in FIG. 28B is the display information displayed on the display unit 13 by the display controller 28 when the determination target 101 is present. In FIG. 28B, a pedestrian serving as the determination target 101 is present on the sidewalk side of the separating zone 102a. FIG. 28B illustrates a case where the path 200 produced by the generation unit 26 is changed so as to avoid danger of contact between the moving body 10 and the determination target 101. On the upper side in the display information, a message that this car runs while being apart from the pedestrian is displayed. In addition, the pedestrian serving as the avoidance object is highlighted.

Figure 28C:
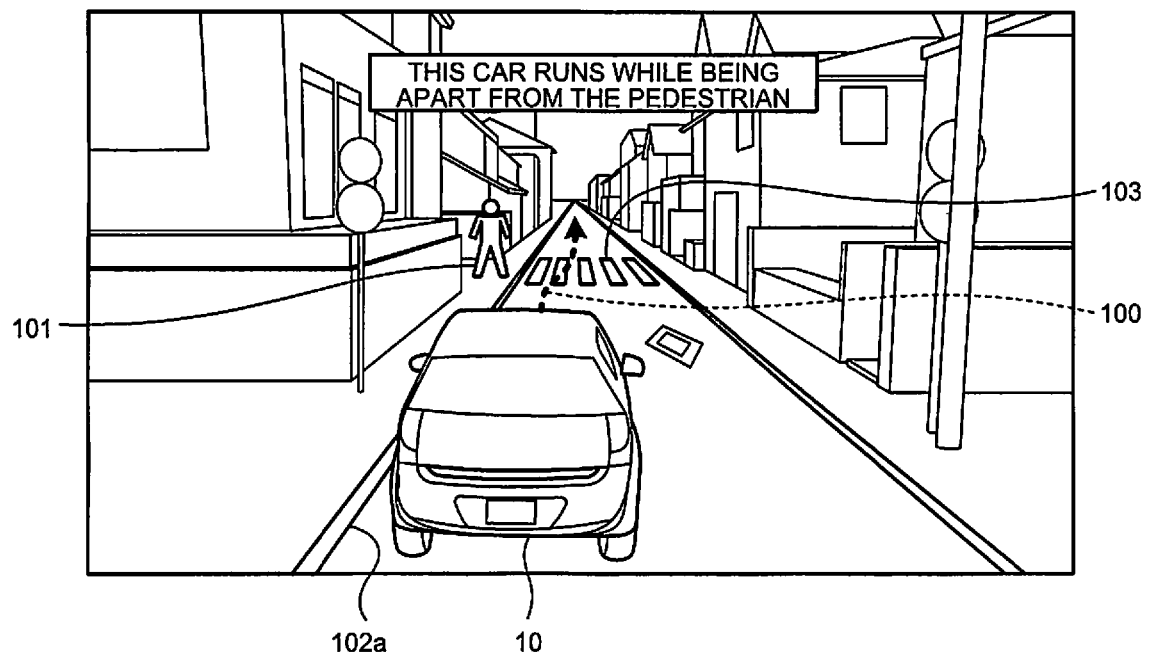
FIG. 28C is a diagram illustrating a third example of the display information displayed in a 3D manner in the first embodiment.

FIG. 28C is a diagram illustrating a third example of the display information displayed in a 3D manner in the first embodiment. The third example of the display information illustrated in FIG. 28C is the display information displayed on the display unit 13 by the display controller 28 when the determination target 101 is present near the pedestrian crosswalk 103. FIG. 28C illustrates a case where the reference path 100 is changed so as to avoid danger of contact between the moving body 10 and the determination target 101. On the upper side in the display information, the message that this car runs while being apart from the pedestrian is displayed.

FIG. 29 is a diagram illustrating an example of the display information displayed as a top view display in the first embodiment. The example illustrated in FIG. 29 is exemplary display information displayed on the display unit 13 by the display controller 28 when the determination target 101 is present. In FIG. 29, a pedestrian serving as the determination target 101 is present on the sidewalk side of the separating zone 102a. FIG. 29 illustrates a case where the reference path 100 is changed so as to avoid danger of contact between the moving body 10 and the determination target 101. On the upper side in the display information, the message that this car runs while being apart from the pedestrian is displayed.

As described above, in the information processing device 20 in the first embodiment, the right side distance determination unit 22 determines the right side distance $\gamma_R$ that indicates a distance from the right end of the running region of the moving body 10 from the right side environmental information that indicates an environment on the right side of the reference path 100 referred to as the scheduled running path of the moving body 10. The left side distance determination unit 23 determines the left side distance $\gamma_L$ that indicates a distance from the left end of the running region of the moving body 10 from the left side environmental information that indicates an environment on the left side of the reference path 100. The change unit 24 changes the reference path 100 to the position at the right side distance $\gamma_R$ when the right side distance $\gamma_R$ is larger than the distance from the right end to the center of the running region while the change unit 24 changes the reference path 100 to the position at the left side distance $\gamma_L$ when the left side distance $\gamma_L$ is larger than the distance from the left end to the center of the running region. The display controller 28 displays the display information including the reference path 100 on the display unit 13.

The information processing device 20 in the first embodiment, thus, can determine a safer running path. The information processing device 20 in the first embodiment can determine a safer running path even when the determination target 101 (e.g., a pedestrian) serving as the determination target for determining whether the target enters the running region of the moving body 10 does not perform a behavior associated with entering the running region.

Second Embodiment

The following describes a second embodiment. In the second embodiment, the description same as that in the first embodiment is omitted and a difference from the first embodiment is described.

In the first embodiment, the method is described for calculating the distance $\gamma$ for avoiding the determination target 101 such as a pedestrian. In the second embodiment, when the formidable separating zone 102 is present while the determination target 101 is not present, a method is described for setting the distance $\gamma$ so as to avoid the separating zone 102. An assumed example of the formidable separating zone 102 is a wall having a height equal to or larger than a threshold. In the second embodiment, formidableness is defined as the height of the separating zone.

FIG. 30 is a table illustrating examples of the left side distance $\gamma_L$ in the second embodiment. FIG. 30 illustrates a case where the left side distances $\gamma_L$ are stored in a lookup table in which ranges of the height of the separating zone 102 and the left side distances $\gamma_L$ are in association with each other. A lookup table for the right side distances $\gamma_R$ is prepared in the same manner as that illustrated in FIG. 30.

The method for determining the distance $\gamma$ from the left side distance $\gamma_L$ and the right side distance $\gamma_R$ is the same as that described with reference to FIG. 21. The description thereof is, thus, omitted.

The information processing device 20 in the second embodiment can determine a safer running path when the formidable separating zone 102 is present.

Third Embodiment

The following describes a third embodiment. In the third embodiment, the description same as that in the first embodiment is omitted and a difference from the first embodiment is described.

In the third embodiment, a method is described for changing the distance $\gamma^*$ that indicates the initial position of the reference path 100 in accordance with preference of the passenger on the moving body 10. An example of the preference of the passenger is that the passenger prefers driving on the ride side, the center, or the left side of the running region. The preference of the passenger may change depending on a situation of obstacles around the moving body 10.

Figure 31:
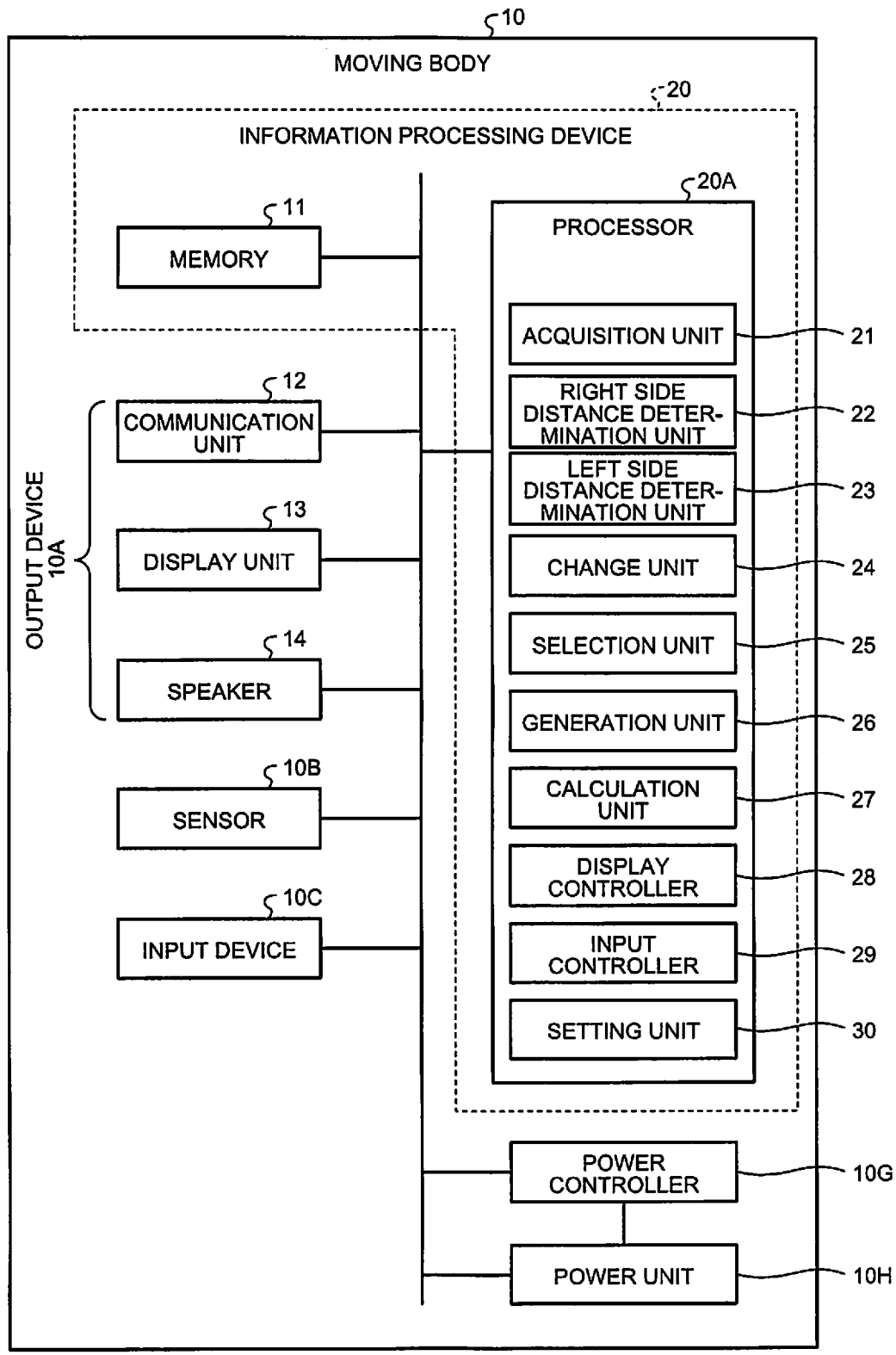
FIG. 31 is a detailed diagram illustrating exemplary structures of the moving body and the information processing device in a third embodiment.

FIG. 31 is a detailed diagram illustrating exemplary structures of the moving body 10 and the information processing device 20 in the third embodiment. The information processing device 20 in the third embodiment includes the memory 11 and the processor 20A. The processor 20A implements the acquisition unit 21, the right side distance determination unit 22, the left side distance determination unit 23, the change unit 24, the selection unit 25, the generation unit 26, the calculation unit 27, the display controller 28, an input controller 29, and a setting unit 30. In the third embodiment, as described above, the input controller 29 and the setting unit 30 are added to the structure of the first embodiment.

The input controller 29 receives, from the input device 10C, input that indicates an initial value of the reference path 100 received by the input device 10C. The input may be performed in a quantitative manner (directly input a value of $\gamma^*$) or in a qualitative manner (a change in position of $\gamma^*$ is received by a left arrow button or a right arrow button on a graphical user interface (GUI)).

The setting unit 30 sets the received input value as the distance $\gamma^*$ indicating the initial value of the reference path 100.

The information processing device 20 in the third embodiment can obtain the same effect as the first embodiment. In addition, the information processing device 20 in the third embodiment can change the initial value of the reference path 100 in accordance with the preference of the passenger on the moving body 10.

The functions of the information processing device 20 in the first, the second, and the third embodiments can be achieved by a computer program, for example.

The computer program executed by the information processing device 20 in the first, the second, and the third embodiments is recorded in a computer-readable recording medium such as a compact disc read only memory (CD- ROM), a memory card, a compact disc recordable (CD-R), and a digital versatile disc (DVD), as an installable or executable file.

The computer program executed by the information processing device 20 in the first, the second, and the third embodiments may be stored in a computer connected to a network such as the Internet and provided by being downloaded via the network. The computer program executed by the information processing device 20 in the first, the second, and the third embodiments may be provided via a network such as the Internet without being downloaded.

The computer program executed by the information processing device 20 in the first, the second, and the third embodiments may be embedded and provided in a ROM, for example.

The computer program executed by the information processing device 20 in the first, the second, and the third embodiments has a module structure including functions achievable by the computer program in the functional structure of the information processing device 20 in the first, the second, and the third embodiments.

A part or the whole of the functions of the information processing device 20 in the first, the second, and the third embodiments may be achieved by hardware such as an integrated circuit (IC).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device, comprising:
    a memory storing instructions;
    one or more hardware processors that are coupled to the memory and configured to execute the instructions to:
        change a position of a reference path to a new position in a running region of a moving body when a lateral distance between the moving body and a lateral end of the running region is larger than a distance between the lateral end of the running region and a center of the running region;
        obtain the lateral distance from a height of a separating zone that separates the running region from a sidewalk, when lateral environmental information includes information indicating that a determination target with likelihood of entering the running region is present,
        wherein the lateral distance is obtained from lateral environmental information indicating a lateral environment of the reference path; and
    a display controller configured to display information including the reference path on a display.

2. An information processing device, comprising:
    a memory storing instructions;
    one or more hardware processors configured to execute the instructions to:
        determine a lateral distance between a moving body and a lateral end of a running region of the moving body from lateral environmental information indicating a lateral environment of a reference path;
        change a position of the reference path to a new position in the running region when the lateral distance is larger than a distance between the lateral end and a center of the running region;
        obtain the lateral distance from a height of a separating zone that separates the running region from a sidewalk, when the lateral environmental information includes information indicating that a determination target with likelihood of entering the running region is present; and
    a display controller configured to display information including the reference path on a display.

3. The device according to claim 1, wherein the one or more hardware processors are further configured to:
    obtain the lateral distance from a thickness of a separating zone that separates the running region from a sidewalk, when the lateral environmental information includes information indicating that a determination target with likelihood of entering the running region is present.

4. The device according to claim 2, wherein the one or more hardware processors are further configured to:
    obtain the lateral distance from a thickness of a separating zone that separates the running region from a sidewalk, when the lateral environmental information includes information indicating that a determination target with likelihood of entering the running region is present.

5. The device according claim 1, wherein the one or more hardware processors are further configured to:
    obtain the lateral distance from a speed of the moving body, when the lateral environmental information includes information indicating that a determination target with likelihood of entering the running region is present.

6. The device according claim 2, wherein the one or more hardware processors are further configured to:
    obtain the lateral distance from a speed of the moving body, when the lateral environmental information includes information indicating that a determination target with likelihood of entering the running region is present.

7. The device according to claim 1, wherein the one or more hardware processors are further configured to:
    obtain the lateral distance based on whether an object that triggers a determination target to enter the running region is present or based on a type of the object, when the lateral environmental information includes information indicating that the determination target with likelihood of entering the running region is present.

8. The device according to claim 2, wherein the one or more hardware processors are further configured to:
    obtain the lateral distance based on whether an object that triggers a determination target to enter the running region is present or based on a type of the object, when the lateral environmental information includes information indicating that the determination target with likelihood of entering the running region is present.

9. The device according to claim 1, wherein the one or more hardware processors are further configured to:
    obtain the lateral distance based on whether a sign that triggers a determination target to enter the running region is present or based on a type of the sign, when the lateral environmental information includes information indicating that the determination target with likelihood of entering the running region is present.

10. The device according to claim 2, wherein the one or more hardware processors are further configured to:

obtain the lateral distance based on whether a sign that triggers a determination target to enter the running region is present or based on a type of the sign, when the lateral environmental information includes information indicating that the determination target with likelihood of entering the running region is present.

11. An information processing device, comprising:

a memory storing instructions;

one or more hardware processors that are coupled to the memory and configured to execute the instructions to:

determine a right side distance indicating a distance between a moving body and a right end of a running region of the moving body, from right side environmental information indicating an environment on a right side of a reference path of the moving body, wherein the left side distance is determined from a height of a left side separating zone that separates the running region from a left side sidewalk when the left side environmental information includes information indicating that the determination target is present;

determine a left side distance indicating a distance between the moving body and a left end of the running region of the moving body, from left side environmental information indicating an environment on a left side of the reference path, wherein the left side distance is determined from a height of a left side separating zone that separates the running region from a left side sidewalk when the left side environmental information includes information indicating that the determination target is present;

change a position of the reference path to a new position at the right side when the right side distance is larger than a distance between the right end and a center of the running region, and change the position of the reference path to a new position at the left side when the left side distance is larger than a distance between the left end and the center of the running region; and a display controller configured to display information including the reference path on a display.

12. The device according to claim 11, wherein the one or more hardware processors are further configured to:

determine that the likelihood to be increased as the height of the right side separating zone is reduced, and determine that the right side distance to be increased as the likelihood is increased; and determine that the likelihood to be increased as the height of the left side separating zone is reduced, and determine that the left side distance to be increased as the likelihood is increased.

13. The device according to claim 11, wherein the one or more hardware processors are further configured to:

identify, from the right side environmental information, a thickness of a right side separating zone that separates the running region from a right side sidewalk when the right side environmental information includes information indicating that a determination target with likelihood of entering the running region is present, determine that the likelihood to be increased as the thickness of the right side separating zone is reduced, and determine that the right side distance to be increased as the likelihood is increased; and identify, from the left side environmental information, a thickness of a left side separating zone that separates the running region from a left side sidewalk when the left side environmental information includes information indicating that the determination target is present, determine that the likelihood to be increased as the thickness of the left side separating zone is reduced, and determine that the left side distance to be increased as the likelihood is increased.

14. The device according to claim 11, wherein the one or more hardware processors are further configured to:

determine that the likelihood to be increased as a speed of the moving body is increased and determine that the right side distance to be increased as the likelihood is increased when the right side environmental information includes information indicating that a determination target with likelihood of entering the running region is present; and determine that the likelihood to be increased as the speed of the moving body is increased and determine that the left side distance to be increased as the likelihood is increased when the left side environmental information includes information indicating that the determination target is present.

15. The device according to claim 11, wherein the one or more hardware processors are further configured to:

identify, from the right side environmental information, whether an object triggering a determination target to enter the running region is present, and determine the right side distance based on a type of the object, when the right side environmental information includes information indicating that the determination target with likelihood of entering the running region is present; and identify, from the left side environmental information, whether the object is present, and determine the left side distance based on the type of the object, when the left side environmental information includes information indicating that the determination target.

16. The device according to claim 11, wherein the one or more hardware processors are further configured to:

identify, from the right side environmental information, whether a sign triggering a determination target to enter the running region is present, and determine the right side distance based on a type of the sign, when the right side environmental information includes information indicating that the determination target with likelihood of entering the running region is present; and identify, from the left side environmental information, whether the sign is present, and determine the left side distance based on the type of the sign, when the left side environmental information includes information indicating that the determination target is present.

17. The device according to claim 11, wherein the one or more hardware processors are further configured to change the reference path to an intermediate position between a position at the right side and a position at the left side when the right side distance is larger than a distance between the right end and the center of the running region and the left side distance is larger than a distance between the left end and the center of the running region.

18. The device according to claim 17, wherein the one or more hardware processors are further configured to calculate deceleration of a speed of the moving body to decelerate the speed, wherein the deceleration is increased as a length of an overlapping region where the right side distance and the left side distance overlap is increased, when the reference path is changed to the intermediate position.

19. The device according to claim 11, wherein the one or more hardware processors are further configured to determine a value indicating a position of the reference path to be changed using a threshold to select the reference path after the change from a plurality of reference paths preliminarily set.

20. The device according to claim 19, wherein the threshold is a hysteresis threshold.

21. The device according to claim 11, wherein the one or more hardware processors are further configured to set an initial value of the reference path such that a position at the initial value is further apart from a separating zone separating the running region from a sidewalk as a height of the separating zone is increased.

22. The device according to claim 11, wherein the one or more hardware processors are further configured to:
    receive an input of an initial value of the reference path; and
    set the received input initial value as the initial value of the reference path.

23. An information processing method, comprising:
    determining a right side distance indicating a distance between a moving body and a right end of a running region of the moving body, from right side environmental information indicating an environment on a right side of a reference path of the moving body;
    determining a left side distance indicating a distance between the moving body and a left end of the running region of the moving body, from left side environmental information indicating an environment on a left side of the reference path;
    changing a position of the reference path to a new position at the right side when the right side distance is larger than a distance between the right end and a center of the running region, and changing the position of the reference path to a new position at the left side when the left side distance is larger than a distance between the left end and the center of the running region;
    obtaining the left side distance and the right side distance from a height of a separating zone that separates the running region from a sidewalk, when a lateral environmental information includes information indicating that a determination target with likelihood of entering the running region is present; and
    displaying information including the reference path on a display.

24. A computer program product comprising a non-transitory computer-readable medium including programmed instructions, the instructions when executed by a computer cause the computer to perform operations including:
    determining a right side distance indicating a distance between a moving body and a right end of a running region of the moving body, from right side environmental information indicating an environment on a right side of a reference path;
    determining a left side distance indicating a distance between the moving body and a left end of the running region of the moving body, from left side environmental information indicating an environment on a left side of the reference path;
    changing a position of the reference path to a new position at the right side when the right side distance is larger than a distance between the right end and a center of the running region, and changing the position of the reference path to a new position at the left side when the left side distance is larger than a distance between the left end and the center of the running region;
    obtaining the left side distance and the right side distance from a height of a separating zone that separates the running region from a sidewalk, when a lateral environmental information includes information indicating that a determination target with likelihood of entering the running region is present; and
    displaying information including the reference path on a display.

* * * * *

UNITED STATES PATENT AND TRADEMARK OFFICE
CERTIFICATE OF CORRECTION

PATENT NO. : 10,926,760 B2  
APPLICATION NO. : 16/123169  
DATED : February 23, 2021  
INVENTOR(S) : Rie Katsuki et al.

Page 1 of 1

It is certified that error appears in the above-identified patent and that said Letters Patent is hereby corrected as shown below:

In the Claims

In Claim 5, Column 18, Line 28, "according claim 1," should read --according to claim 1,--.

In Claim 6, Column 18, Line 35, "according claim 2," should read --according to claim 2,--.

In Claim 23, Column 21, Lines 24-25, "distance-between" should read --distance between--.

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*